(12) United States Patent
Calley et al.

(10) Patent No.: US 8,222,786 B2
(45) Date of Patent: Jul. 17, 2012

(54) TRANSVERSE AND/OR COMMUTATED FLUX SYSTEMS HAVING PHASE OFFSET

(75) Inventors: David G. Calley, Flagstaff, AZ (US); Daniel S Cole, Flagstaff, AZ (US); John M. Dyer, Flagstaff, AZ (US); Thomas F. Janecek, Flagstaff, AZ (US)

(73) Assignee: Motor Excellence LLC, Flagstaff, AZ (US)

( * ) Notice: Subject to any disclaimer, the term of this patent is extended or adjusted under 35 U.S.C. 154(b) by 4 days.

(21) Appl. No.: 12/772,962

(22) Filed: May 3, 2010

(65) Prior Publication Data

US 2011/0169366 A1 Jul. 14, 2011

Related U.S. Application Data

(60) Provisional application No. 61/314,071, filed on Mar. 15, 2010.

(51) Int. Cl.
*H02K 21/12* (2006.01)

(52) U.S. Cl. ...... 310/156.02; 310/216.112; 310/216.071

(58) Field of Classification Search ............ 310/156.02, 310/216.112, 216.071
See application file for complete search history.

(56) References Cited

U.S. PATENT DOCUMENTS

| | | |
|---|---|---|
| 1,361,136 A | 12/1920 | Burke |
| 2,078,668 A | 4/1937 | Kilgore |
| 2,122,307 A | 6/1938 | Welch |
| 3,403,273 A | 9/1968 | Hiroshi |
| 3,437,854 A | 4/1969 | Oiso |
| 3,558,941 A | 1/1971 | Visconti Brebbia et al. |
| 3,700,942 A | 10/1972 | Alth |
| 3,710,158 A | 1/1973 | Bachle et al. |
| 3,774,059 A | 11/1973 | Cox |
| 3,869,625 A | 3/1975 | Sawyer |
| 3,984,711 A | 10/1976 | Kordik |
| 3,999,107 A | 12/1976 | Reuting |
| 4,021,691 A | 5/1977 | Dukshtau et al. |
| 4,114,057 A | 9/1978 | Esters |
| 4,127,802 A | 11/1978 | Johnson |
| 4,206,374 A | 6/1980 | Goddijn |
| 4,237,396 A | 12/1980 | Blenkinsop et al. |
| 4,237,397 A | 12/1980 | Mohr et al. |
| 4,255,684 A | 3/1981 | Mischler et al. |
| 4,255,696 A | 3/1981 | Field, II |

(Continued)

FOREIGN PATENT DOCUMENTS

CN 201264675 7/2009

(Continued)

OTHER PUBLICATIONS

Machine translation of foreign document DE 4132340.*

(Continued)

*Primary Examiner* — Quyen Leung
*Assistant Examiner* — Alex W Mok
(74) *Attorney, Agent, or Firm* — Invention To Patent Services LLC; Alex R Hobson

(57) ABSTRACT

Electrical machines, for example transverse flux machines and/or commutated flux machines, may be configured to achieve reduced overall cogging torque via implementation of a sixth-phase offset. Individual cogging torque waveforms in the electrical machine may be evenly distributed across one-sixth of a voltage phase or other suitable spacing, resulting in a reduced magnitude and/or increased sinusoidality of the overall cogging torque waveform for the electrical machine.

16 Claims, 16 Drawing Sheets

U.S. PATENT DOCUMENTS

| | | | |
|---|---|---|---|
| 4,286,180 A | 8/1981 | Langley | |
| 4,306,164 A | 12/1981 | Itoh et al. | |
| 4,339,875 A | 7/1982 | Muller | |
| 4,363,988 A | 12/1982 | Kliman | |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,508,984 A | 4/1985 | Guedj | |
| 4,605,874 A | 8/1986 | Whiteley | |
| 4,611,139 A | 9/1986 | Godkin et al. | |
| 4,620,752 A | 11/1986 | Fremerey et al. | |
| 4,639,626 A | 1/1987 | McGee | |
| 4,658,166 A | 4/1987 | Oudet | |
| 4,704,555 A | 11/1987 | Stokes | |
| 4,780,634 A * | 10/1988 | Masterman | 310/179 |
| 4,794,286 A | 12/1988 | Taenzer | |
| 4,797,602 A | 1/1989 | West | |
| 4,801,834 A | 1/1989 | Stokes | |
| 4,835,840 A | 6/1989 | Stokes | |
| 4,850,100 A | 7/1989 | Stokes | |
| 4,857,786 A | 8/1989 | Nihei et al. | |
| 4,883,999 A * | 11/1989 | Hendershot | 310/216.071 |
| 4,899,072 A | 2/1990 | Ohta | |
| 4,900,965 A | 2/1990 | Fisher | |
| 4,959,577 A | 9/1990 | Radomski | |
| 4,990,812 A * | 2/1991 | Nam | 310/216.038 |
| 5,015,903 A | 5/1991 | Hancock | |
| 5,038,066 A | 8/1991 | Pawlak et al. | |
| 5,051,641 A | 9/1991 | Weh | |
| 5,062,012 A | 10/1991 | Maeda et al. | |
| 5,097,167 A | 3/1992 | Kanayama et al. | |
| 5,117,142 A | 5/1992 | von Zweygbergk | |
| 5,130,595 A | 7/1992 | Arora | |
| 5,132,581 A | 7/1992 | Kusase | |
| 5,177,054 A | 1/1993 | Lloyd | |
| 5,195,231 A | 3/1993 | Fanning et al. | |
| 5,208,503 A | 5/1993 | Hisey | |
| 5,212,419 A | 5/1993 | Fisher et al. | |
| 5,214,333 A | 5/1993 | Kawamura | |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,382,859 A | 1/1995 | Huang et al. | |
| 5,386,166 A | 1/1995 | Reimer et al. | |
| 5,477,841 A | 12/1995 | Trost et al. | |
| 5,485,072 A | 1/1996 | Fehringer | |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,696,419 A | 12/1997 | Rakestraw et al. | |
| 5,712,521 A | 1/1998 | Detela | |
| 5,717,262 A | 2/1998 | Muller | |
| 5,723,921 A | 3/1998 | Sugiura | |
| 5,726,514 A | 3/1998 | Wurz et al. | |
| 5,729,065 A | 3/1998 | Fremery et al. | |
| 5,731,649 A | 3/1998 | Caamano | |
| 5,773,910 A | 6/1998 | Lange | |
| 5,777,418 A | 7/1998 | Lange et al. | |
| 5,780,953 A | 7/1998 | Umeda et al. | |
| 5,814,907 A | 9/1998 | Bandera | |
| 5,839,530 A | 11/1998 | Dietzel | |
| 5,844,343 A * | 12/1998 | Horst | 310/184 |
| 5,879,265 A | 3/1999 | Bek | |
| 5,886,449 A | 3/1999 | Mitcham | |
| 5,889,348 A | 3/1999 | Muhlberger et al. | |
| 5,894,183 A | 4/1999 | Borchert | |
| 5,909,339 A | 6/1999 | Hong | |
| 5,925,965 A | 7/1999 | Li et al. | |
| 5,942,828 A | 8/1999 | Hill | |
| 5,954,779 A | 9/1999 | Dietzel | |
| 5,973,436 A * | 10/1999 | Mitcham | 310/266 |
| 5,994,802 A | 11/1999 | Shichijyo et al. | |
| 5,994,814 A | 11/1999 | Kawabata | |
| 6,028,377 A | 2/2000 | Sakamoto | |
| 6,043,579 A | 3/2000 | Hill | |
| 6,046,517 A * | 4/2000 | Sasaki et al. | 310/40 MM |
| 6,060,810 A | 5/2000 | Lee et al. | |
| 6,066,906 A | 5/2000 | Kalsi | |
| 6,081,053 A * | 6/2000 | Maegawa et al. | 310/49.39 |
| 6,097,118 A | 8/2000 | Hull | |
| 6,097,126 A | 8/2000 | Takura | |
| 6,118,159 A | 9/2000 | Fan | |
| 6,121,712 A | 9/2000 | Sakamoto | |
| 6,133,655 A | 10/2000 | Suzuki et al. | |
| 6,133,664 A | 10/2000 | Torok et al. | |
| 6,133,669 A | 10/2000 | Tupper | |
| 6,137,202 A | 10/2000 | Holmes et al. | |
| 6,154,013 A | 11/2000 | Caamano | |
| 6,157,107 A * | 12/2000 | Aoshima et al. | 310/156.02 |
| 6,163,097 A | 12/2000 | Smith et al. | |
| 6,166,471 A * | 12/2000 | Kometani et al. | 310/198 |
| 6,175,177 B1 | 1/2001 | Sabinski et al. | |
| 6,177,748 B1 | 1/2001 | Katcher et al. | |
| 6,181,035 B1 | 1/2001 | Acquaviva | |
| 6,194,799 B1 | 2/2001 | Miekka | |
| 6,215,616 B1 | 4/2001 | Phan et al. | |
| 6,229,238 B1 | 5/2001 | Graef | |
| 6,232,693 B1 | 5/2001 | Gierer et al. | |
| 6,236,131 B1 | 5/2001 | Schafer | |
| 6,246,561 B1 | 6/2001 | Flynn | |
| 6,278,216 B1 * | 8/2001 | Li | 310/424 |
| 6,288,467 B1 | 9/2001 | Lange et al. | |
| 6,300,702 B1 | 10/2001 | Jack et al. | |
| 6,304,010 B1 | 10/2001 | Sugiura | |
| 6,333,582 B1 | 12/2001 | Asao | |
| 6,342,746 B1 | 1/2002 | Flynn | |
| 6,365,999 B1 | 4/2002 | Muhlberger et al. | |
| 6,411,003 B1 * | 6/2002 | Sasaki et al. | 310/156.02 |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,472,792 B1 | 10/2002 | Jack et al. | |
| 6,492,758 B1 | 12/2002 | Gianni et al. | |
| 6,508,321 B1 | 1/2003 | Muller | |
| 6,545,376 B2 * | 4/2003 | Ohnishi et al. | 310/49.34 |
| 6,545,382 B1 | 4/2003 | Bennett | |
| 6,603,060 B1 | 8/2003 | Ohashi et al. | |
| 6,603,237 B1 | 8/2003 | Caamano | |
| 6,629,574 B2 | 10/2003 | Turner | |
| 6,657,329 B2 | 12/2003 | Kastinger et al. | |
| 6,664,704 B2 * | 12/2003 | Calley | 310/257 |
| 6,700,271 B2 | 3/2004 | Detela | |
| 6,707,208 B2 | 3/2004 | Durham et al. | |
| 6,717,297 B2 | 4/2004 | Sadarangani et al. | |
| 6,750,582 B1 | 6/2004 | Neet | |
| 6,765,321 B2 | 7/2004 | Sakamoto | |
| 6,774,512 B2 | 8/2004 | Takagi et al. | |
| 6,791,225 B2 | 9/2004 | Campbell et al. | |
| 6,794,791 B2 | 9/2004 | Ben Ahmed et al. | |
| 6,800,970 B2 * | 10/2004 | Aoshima | 310/49.32 |
| 6,806,602 B2 | 10/2004 | Hilzinger | |
| 6,815,863 B1 | 11/2004 | Jack et al. | |
| 6,822,351 B2 * | 11/2004 | Matsushita et al. | 310/49.36 |
| 6,835,941 B1 | 12/2004 | Tanaka | |
| 6,841,908 B2 | 1/2005 | Hasegawa | |
| 6,847,135 B2 | 1/2005 | Kastinger et al. | |
| 6,849,985 B2 | 2/2005 | Jack et al. | |
| 6,853,112 B2 | 2/2005 | Nakamura et al. | |
| 6,866,111 B2 | 3/2005 | Dube | |
| 6,867,530 B2 | 3/2005 | Gamm et al. | |
| 6,879,080 B2 | 4/2005 | Caamano | |
| 6,882,066 B2 | 4/2005 | Kastinger | |
| 6,882,077 B2 | 4/2005 | Neet | |
| 6,885,124 B2 | 4/2005 | Neet | |
| 6,885,129 B1 | 4/2005 | Oohashi et al. | |
| 6,888,272 B2 | 5/2005 | Kastinger | |
| 6,924,576 B2 | 8/2005 | Zierer | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,952,068 B2 | 10/2005 | Gieras | |
| 6,960,860 B1 | 11/2005 | DeCristofaro | |

| | | |
|---|---|---|
| 6,960,862 B2 | 11/2005 | Hill |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Caamano |
| 7,034,425 B2 | 4/2006 | Detela |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,124,495 B2 | 10/2006 | Gieras |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,216,732 B2 | 5/2007 | Angerer |
| 7,230,361 B2 | 6/2007 | Hirzel |
| 7,242,118 B2 | 7/2007 | Sakamoto |
| 7,245,055 B2 | 7/2007 | Jack |
| 7,250,704 B1 | 7/2007 | Sortore et al. |
| 7,259,483 B2 | 8/2007 | Komiya et al. |
| 7,261,186 B2 | 8/2007 | Deplazes |
| 7,265,472 B2 | 9/2007 | Mitcham |
| 7,268,456 B2 | 9/2007 | Harada et al. |
| 7,275,844 B2 | 10/2007 | Watanabe |
| 7,279,820 B2 | 10/2007 | Grundl et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,474,030 B2 | 1/2009 | Mitcham |
| 7,560,840 B2 | 7/2009 | Lange |
| 7,579,742 B1 | 8/2009 | Rittenhouse |
| 7,592,735 B2 | 9/2009 | Hamada |
| 7,602,095 B2 | 10/2009 | Kusase |
| 7,626,308 B2 | 12/2009 | Kang |
| 7,638,919 B2 | 12/2009 | Pulnikov et al. |
| 7,679,253 B2 | 3/2010 | Neet |
| 7,719,156 B2 | 5/2010 | Muhlberger |
| 7,800,275 B2 | 9/2010 | Calley |
| 7,851,965 B2 | 12/2010 | Calley |
| 7,859,141 B2 | 12/2010 | Sadarangani |
| 7,863,797 B2 | 1/2011 | Calley |
| 7,868,508 B2 | 1/2011 | Calley et al. |
| 7,868,511 B2 | 1/2011 | Calley |
| 7,876,019 B2 | 1/2011 | Calley |
| 7,923,886 B2 | 4/2011 | Calley et al. |
| 7,952,252 B2 | 5/2011 | Kang et al. |
| 7,973,446 B2 | 7/2011 | Calley et al. |
| 2001/0001528 A1 | 5/2001 | Ragaly |
| 2001/0030479 A1 | 10/2001 | Mohler |
| 2001/0030486 A1 | 10/2001 | Pijanowski |
| 2001/0030487 A1 | 10/2001 | Higashino |
| 2002/0070627 A1 | 6/2002 | Ward et al. |
| 2002/0113520 A1 | 8/2002 | Kastinger et al. |
| 2002/0135242 A1 | 9/2002 | Kawai |
| 2002/0171315 A1 | 11/2002 | Kastinger |
| 2002/0190585 A1 | 12/2002 | Sakamoto |
| 2003/0048018 A1 | 3/2003 | Sadarangani |
| 2003/0102751 A1 | 6/2003 | Bryant |
| 2003/0122439 A1 | 7/2003 | Horst |
| 2003/0122440 A1 | 7/2003 | Horst |
| 2003/0122442 A1 | 7/2003 | Jack et al. |
| 2004/0027021 A1 | 2/2004 | Karrelmeyer |
| 2004/0036370 A1 | 2/2004 | Hilzinger |
| 2004/0046478 A1 | 3/2004 | Zierer et al. |
| 2004/0061396 A1 | 4/2004 | Narita et al. |
| 2004/0075357 A1* | 4/2004 | Kastinger et al. ........ 310/156.02 |
| 2004/0140730 A1 | 7/2004 | Barrho et al. |
| 2004/0145269 A1 | 7/2004 | Barrho et al. |
| 2004/0150288 A1* | 8/2004 | Calley ........................ 310/257 |
| 2004/0189138 A1 | 9/2004 | Jack |
| 2004/0207281 A1* | 10/2004 | Detela ........................ 310/162 |
| 2004/0207283 A1* | 10/2004 | Oohashi et al. ............... 310/207 |
| 2004/0212267 A1 | 10/2004 | Jack et al. |
| 2004/0222706 A1 | 11/2004 | Ickinger |
| 2004/0232793 A1 | 11/2004 | Fujita |
| 2004/0232799 A1 | 11/2004 | Chen et al. |
| 2004/0239207 A1 | 12/2004 | Kloepzig et al. |
| 2004/0251759 A1 | 12/2004 | Hirzel |
| 2004/0251761 A1 | 12/2004 | Hirzel |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0029879 A1 | 2/2005 | Endo |
| 2005/0062348 A1 | 3/2005 | Ohnishi et al. |
| 2005/0062352 A1* | 3/2005 | Kastinger ................ 310/156.02 |
| 2005/0088056 A1 | 4/2005 | Kuribayashi |
| 2005/0121983 A1 | 6/2005 | Ehrhart |
| 2005/0156479 A1 | 7/2005 | Fujita |
| 2005/0156480 A1 | 7/2005 | Imai |
| 2005/0212381 A1 | 9/2005 | Gilmour et al. |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0055280 A1 | 3/2006 | Isoda |
| 2006/0082237 A1 | 4/2006 | Kerlin |
| 2006/0087180 A1 | 4/2006 | Woo |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0186754 A1 | 8/2006 | Kitamura et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0007842 A1* | 1/2007 | Shim et al. ................... 310/166 |
| 2007/0013253 A1 | 1/2007 | Dubois et al. |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2007/0188037 A1 | 8/2007 | Lau |
| 2007/0267929 A1* | 11/2007 | Pulnikov et al. ......... 310/156.02 |
| 2008/0007126 A1 | 1/2008 | Popov et al. |
| 2008/0042507 A1 | 2/2008 | Edelson |
| 2008/0169776 A1 | 7/2008 | Acker |
| 2008/0179982 A1 | 7/2008 | Kramer |
| 2008/0211326 A1 | 9/2008 | Kang |
| 2008/0211336 A1 | 9/2008 | Sadarangani |
| 2008/0246362 A1* | 10/2008 | Hirzel ..................... 310/156.02 |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0021099 A1 | 1/2009 | Shkondin |
| 2009/0026853 A1 | 1/2009 | Groening |
| 2009/0026866 A1 | 1/2009 | Groening |
| 2009/0085415 A1 | 4/2009 | Ionel et al. |
| 2009/0127942 A1 | 5/2009 | Rahman et al. |
| 2009/0160288 A1 | 6/2009 | Calley |
| 2009/0206693 A1 | 8/2009 | Calley et al. |
| 2009/0206696 A1 | 8/2009 | Calley |
| 2009/0208771 A1 | 8/2009 | Janecek |
| 2009/0243406 A1 | 10/2009 | Jack et al. |
| 2009/0255924 A1 | 10/2009 | Lovens |
| 2009/0284253 A1 | 11/2009 | Finkler et al. |
| 2009/0295237 A1 | 12/2009 | Gloor |
| 2009/0322165 A1 | 12/2009 | Rittenhouse |
| 2010/0013341 A1 | 1/2010 | Vollmer |
| 2010/0013343 A1 | 1/2010 | Bi |
| 2010/0026135 A1* | 2/2010 | Hussey et al. .......... 310/216.111 |
| 2010/0052467 A1 | 3/2010 | Gieras |
| 2011/0025140 A1 | 2/2011 | Pennander et al. |
| 2011/0025141 A1 | 2/2011 | Nord et al. |
| 2011/0037329 A1 | 2/2011 | Nord et al. |
| 2011/0050010 A1 | 3/2011 | Calley et al. |
| 2011/0062723 A1 | 3/2011 | Calley et al. |
| 2011/0133485 A1 | 6/2011 | Gieras |
| 2011/0169357 A1 | 7/2011 | Gieras |

FOREIGN PATENT DOCUMENTS

| | | |
|---|---|---|
| CN | 101552534 | 10/2009 |
| CN | 101834510 | 9/2010 |
| DE | 1513856 | 4/1969 |

| | | |
|---|---|---|
| DE | 3626149 | 8/1986 |
| DE | 3602687 | 8/1987 |
| DE | 8711725 | 8/1987 |
| DE | 3904516 | 6/1990 |
| DE | 3927453 | 2/1991 |
| DE | 4132340 | 3/1993 |
| DE | 4132340 A1 * | 3/1993 |
| DE | 19639670 | 4/1998 |
| DE | 19634949 | 5/1998 |
| DE | 19650572 | 6/1998 |
| DE | 19753261 | 6/1998 |
| DE | 19753320 | 6/1998 |
| DE | 199650697 | 6/1998 |
| DE | 19704392 | 8/1998 |
| DE | 19743906 | 4/1999 |
| DE | 19856526 | 6/2000 |
| DE | 19858304 | 6/2000 |
| DE | 199960737 | 7/2001 |
| DE | 10047675 | 4/2002 |
| DE | 10053265 | 5/2002 |
| DE | 10062073 | 6/2002 |
| DE | 10128646 | 1/2003 |
| DE | 10130702 | 1/2003 |
| DE | 10145820 | 4/2003 |
| DE | 102006026719 | 6/2006 |
| DE | 102005020952 | 11/2006 |
| DE | 102006048561 | 4/2008 |
| DE | 102006051234 | 5/2008 |
| DE | 102007018930 | 10/2008 |
| DE | 102008054381 | 6/2010 |
| DE | 102009060955 | 7/2011 |
| DE | 102009060956 | 7/2011 |
| DE | 102009060959 | 7/2011 |
| EP | 0544200 | 11/1992 |
| EP | 0707374 | 4/1996 |
| EP | 0718959 | 6/1996 |
| EP | 0796758 | 9/1997 |
| EP | 0833429 | 4/1998 |
| EP | 0858149 | 8/1998 |
| EP | 0865978 | 9/1998 |
| EP | 0906842 | 4/1999 |
| EP | 0998010 | 3/2000 |
| EP | 1063754 | 12/2000 |
| EP | 1108584 | 6/2001 |
| EP | 1117168 | 7/2001 |
| EP | 1191663 | 3/2002 |
| EP | 1227566 | 7/2002 |
| EP | 1267471 | 12/2002 |
| EP | 1294075 | 3/2003 |
| EP | 1921730 | 5/2008 |
| EP | 2317633 | 5/2011 |
| GB | 518298 | 9/1938 |
| GB | 2052176 | 1/1986 |
| GB | 2287134 | 6/1995 |
| JP | 60241758 | 11/1985 |
| JP | 61042248 | 2/1986 |
| JP | 2001025197 | 1/2001 |
| KR | 1007577330000 | 9/2007 |
| KR | 10-2008-0061415 | 3/2008 |
| KR | 20090058632 | 6/2009 |
| KR | 20110028189 | 3/2011 |
| WO | WO 93/14551 | 7/1993 |
| WO | WO 99/34497 | 7/1999 |
| WO | 0060720 | 10/2000 |
| WO | WO 02/075895 | 9/2002 |
| WO | 03003548 | 1/2003 |
| WO | 2004065068 | 8/2004 |
| WO | WO 2005/091475 | 9/2005 |
| WO | 2006117210 | 5/2006 |
| WO | WO 2007024184 | 3/2007 |
| WO | 2008128659 | 10/2008 |
| WO | WO2009/027938 | 3/2009 |
| WO | WO 2009116935 | 9/2009 |
| WO | WO 2009116936 | 9/2009 |
| WO | WO 2009116937 | 9/2009 |
| WO | WO2009/133295 | 11/2009 |
| WO | WO 2009/156297 | 12/2009 |
| WO | WO2010/036221 | 4/2010 |
| WO | WO2010/048928 | 5/2010 |
| WO | 2010076081 | 7/2010 |
| WO | WO2010/133295 | 11/2010 |
| WO | 2011080285 | 7/2011 |
| WO | 2011080293 | 7/2011 |
| WO | 2011080294 | 7/2011 |

OTHER PUBLICATIONS

Notice of Allowance dated Apr. 19, 2011 for U.S. Appl. No. 12/942,495.
ISR & WO dated Apr. 12, 2011 for International Application No. PCT/US2010/033445.
ISR & WO dated Apr. 12, 2011 for International Application No. PCT/US2010/033444.
ISR & WO dated Apr. 12, 2011 for International Application No. PCT/US2010/033446.
Notice of Allowance dated Mar. 29, 2005 for U.S. Appl. No. 10/721,765.
Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
ISR/WO dated Aug. 15, 2008 for International Patent Application No. PCT/US2008/063301.
IPRP dated Nov. 10, 2009 for International Patent Application No. PCT/US2008/063301.
ISR/WO dated Aug. 20, 2008 for International Patent Application No. PCT/US2008/063236.
IPRP dated Nov. 17, 2009 for International Patent Application No. PCT/US2008/063236.
ISR/WO dated Oct. 24, 2008 for International Patent Application No. PCT/US2008/063336.
IPRP dated Nov. 17, 2009 for International Patent Application No. PCT/US2008/063336.
ISR/WO dated Aug. 15, 2008 for International Patent Application No. PCT/US2008/063287.
IPRP dated Nov. 10, 2009 for International Patent Application No. PCT/US2008/063287.
ISR/WO dated Nov. 10, 2009 for International Patent Application No. PCT/US2008/063268.
IPRP dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method", by Y.G. Guo et al., Faculty of Engineering, University of Technology, Sydney.
"Applications of Power Electronics in Automotive Power Generation",-by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.

Dubois, Maxine R. et al.; "Clawpole Transverse-Flux Machine with Hybrid Stator"; pp. 1-6.

Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.

Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.

Husband, S.M. et al.; "The Rolls-Royce Transverse Flux Motor Development"; Electric Machines and Drives Conference, vol. 3, pp. 1435-1440, IEEE, 2003.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

Fundamental Modeling for Optimal Design of Transverse Flux Motors—Genevieve Patterson et al., University of Tokyo.

www.higenmotor.com/eng/aboutus/about06read.asp?id=notice &no=87 dated Jan. 15, 2010.

Lyng Eltorque QT 800—2.0 User Manual, version 1.0—dated Jul. 3, 2007.

Motors: Emerging Concepts by George Holling, Apr. 2007.

www.iem.rwth-aachen.de/index.pl/new materials and machines?makePrintable=1; retrieved Jan. 15, 2010.

Raser Technologies Company Brochure.

Response to Office Action filed Jan. 15, 2010 for Japanese Patent Application No. JPPA-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

International Preliminary Report on Patentability dated May 3, 2011, PCT/US2009/063142.

International Preliminary Report on Patentability dated May 3, 2011, PCT/US2009/063145.

International Preliminary Report on Patentability dated May 3, 2011, PCT/US2009/063147.

Notice of Allowance dated May 23, 2011, U.S. Appl. No. 13/039,837.

Notice of Allowance dated Jul. 8, 2011, U.S. Appl. No. 12/772,958.

Restriction Requirement dated Jul. 7, 2011, U.S. Appl. No. 12/772,959.

Technical Project Presentation—Development of a High-Performance Generator for Wind Turbines—by Andrzej M. Trzynadlowski, PhD, University of Nevada, Reno, FIEEE, Aug. 2007.

"Magnetic Field Calculation of Claw Pole Permanent Magnet Machines Using Magnetic Network Method": J. Elect. Electron. Eng., Australia, vol. 22, No. 1, pp. 69-75, 2002.

"Iron Loss Calculation in a Claw-Pole Structure", by A. Reinap et al., Lund University, Jun. 2004.

Dubois, Maxine R. et al.; "Clawpole Transverse-Flux Machine with Hybrid Stator"; pp. 1-6, Jul. 15, 2006.

Fundamental Modeling for Optimal Design of Transverse Flux Motors—Genevieve Patterson et al., University of Tokyo, 2008.

Raser Technologies Company Brochure, 2005.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

Notice of Allowance dated Mar. 31, 2011 for U.S. Appl. No. 12/948,925.

Restriction Requirement dated Dec. 20, 2010 for U.S. Appl. No. 12/149,933.

Final Office Action dated Jan. 4, 2011 for U.S. Appl. No. 12/149,936.

Restriction Requirement dated Feb. 24, 2011 for U.S. Appl. No. 12/942,495.

Notice of Allowance dated Feb. 28, 2011 for U.S. Appl. No. 12/149,936.

"Two Dimensional Finite Analysis of Passive Rotor Transverse Flux Motors with Slanted Rotor Design" by B.E. Hasubek, et al., May 1999.

Notice of Allowance dated Nov. 2, 2010 for U.S. Appl. No. 12/847,991.

Notice of Allowance dated Dec. 9, 2010 for U.S. Appl. No. 12/611,733.

Office Action dated Sep. 12, 2011 for U.S. Appl. No. 12/772,962.

Office Action dated Sep. 14, 2011 for U.S. Appl. No. 12/772,959.

Office Action dated Sep. 20, 2011 for U.S. Appl. No. 13/112,619.

* cited by examiner

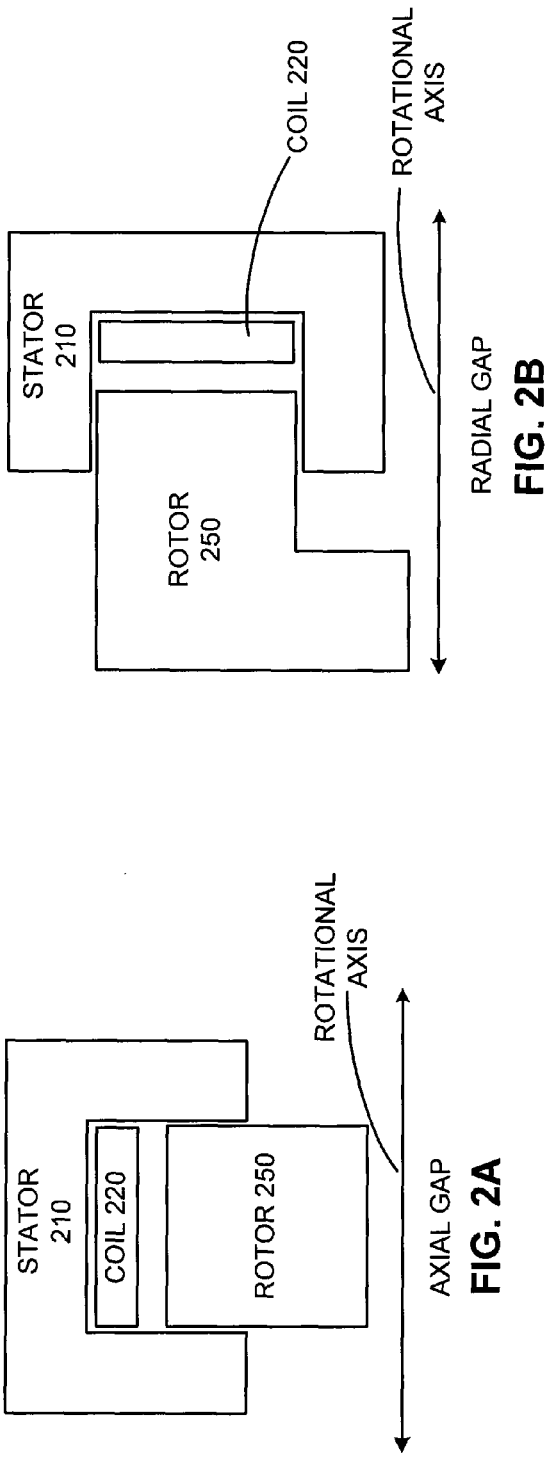
FIG. 2A
FIG. 2B
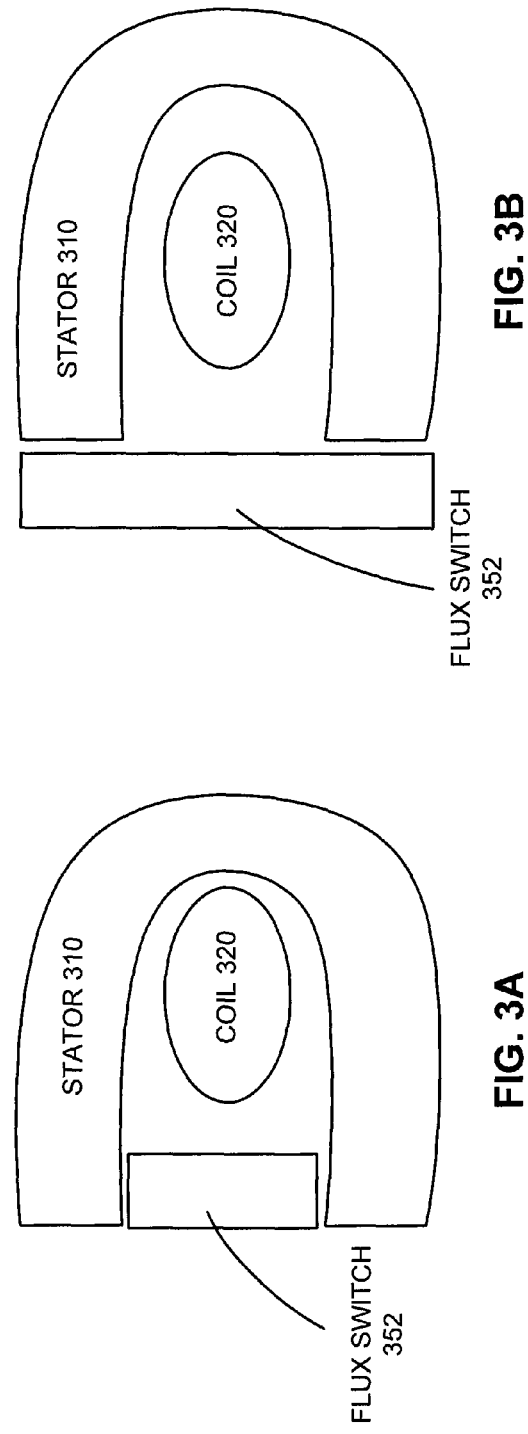
FIG. 3A
FIG. 3B

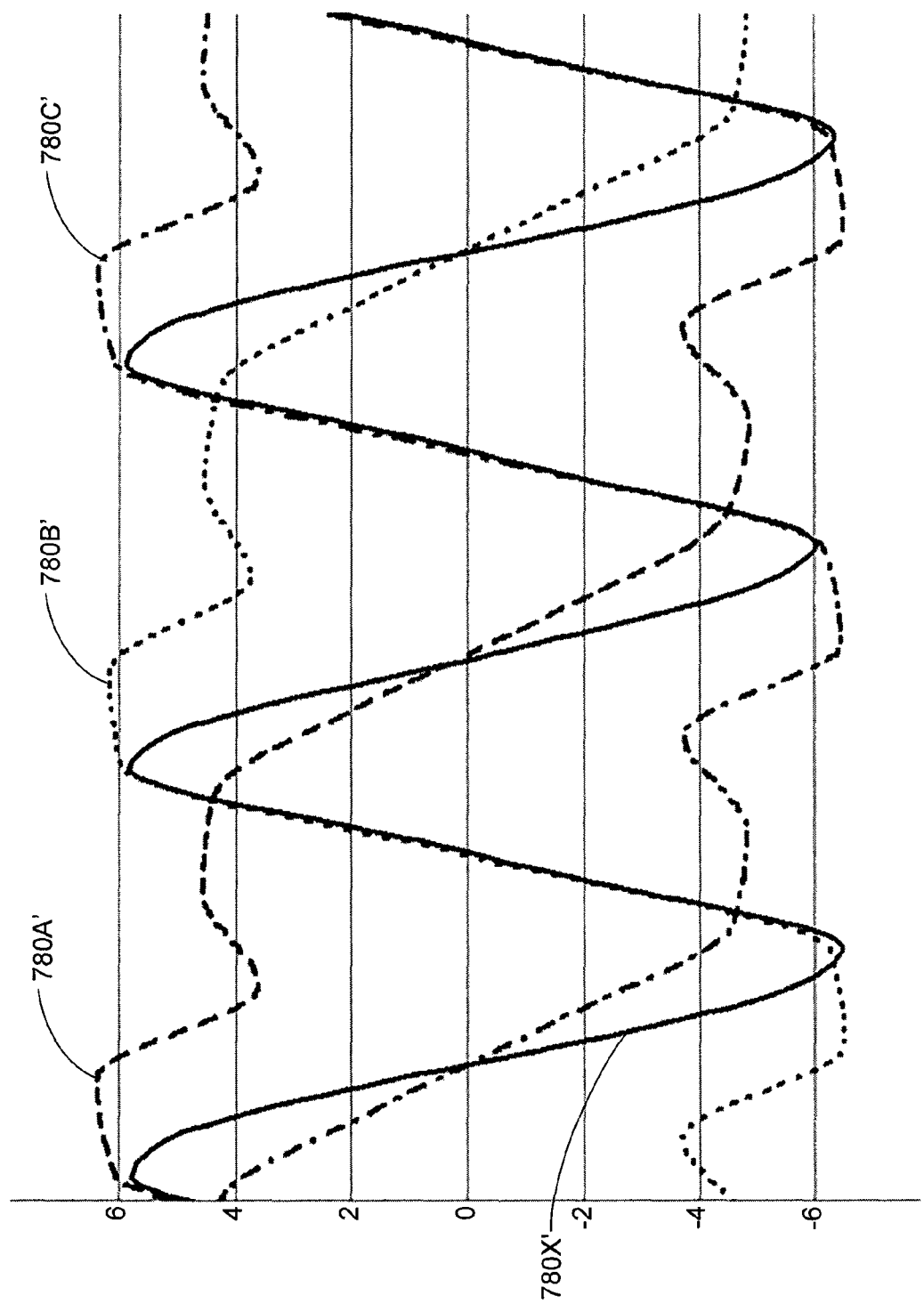

TRANSVERSE AND/OR COMMUTATED FLUX SYSTEMS HAVING PHASE OFFSET

CROSS REFERENCE TO RELATED APPLICATIONS

This application is a non-provisional of U.S. Provisional No. 61/314,071 filed on Mar. 15, 2010 and entitled "TRANSVERSE AND/OR COMMUTATED FLUX SYSTEMS HAVING PHASE OFFSET." The entire contents of the foregoing application are hereby incorporated by reference.

TECHNICAL FIELD

The present disclosure relates to electrical systems, and in particular to transverse flux machines and commutated flux machines.

BACKGROUND

Cogging torque is a condition present in most permanent magnet electric machines, for example electrical motors and generators. When unenergized, the electrical machine seeks a rotational position that results in the lowest magnetic circuit reluctance (or the highest permeance). This condition may be perceived as intermittent resistance to rotation of the electrical machine. The net cogging torque as the electrical machine rotates is zero, as the cogging torque alternately "resists" and "encourages" rotation of the electrical machine. However, because the momentary cogging torque at most rotational positions of the electrical machine is non-zero, the cogging torque causes noise and vibration within the electrical machine. This can potentially lead to wear on and/or premature failure of electrical and/or mechanical components. Additionally, it can cause vibration within systems driven by and/or driving the electrical machine, resulting in additional noise, wear, and/or failure.

Because of these and other undesirable consequences of cogging torque, many prior approaches for reducing and/or minimizing cogging torque have been attempted. However, it remains desirable to provide improved systems and methods for reducing and/or minimizing cogging torque in electrical machines and/or providing electrical machines having back EMF waveforms that more closely approximate an ideal sinusoid, particularly in transverse flux machines and/or commutated flux machines.

SUMMARY

This disclosure relates to systems and methods for modifying cogging torque in transverse and/or commutated flux machines. In an exemplary embodiment, a stator for a transverse flux machine comprises a first stator portion comprising a first set of stator teeth in number N disposed about the circumference of the first stator portion. A first stator tooth and an adjacent second stator tooth in the first set of stator teeth are separated, center to center, by an angular distance of about (360/N) degrees plus about (⅙*(360/N)) degrees. All other adjacent stator teeth in the first set of stator teeth are separated, center to center, by an angular distance of about (360/N) degrees minus about ((⅙*(360/N))/(N−1)) degrees.

In another exemplary embodiment, an electrical machine comprises a rotor, and a first stator, second stator, and third stator at least partially enclosing a first coil, second coil, and third coil, respectively. The first stator, second stator, and third stator are each configured with a sixth-phase offset. The first stator, second stator, and third stator are each magnetically coupled to the rotor, and the first stator, second stator, and third stator differ in phase from one another. The electrical machine is at least one of a transverse flux machine or a commutated flux machine.

In another exemplary embodiment, an electrical machine comprises a rotor, and a stator at least partially enclosing a coil. The interaction of the rotor and stator produces a plurality of cogging torque waveforms, and the plurality of cogging torque waveforms are evenly distributed across a phase shift from zero to one-sixth of a voltage phase of the electrical machine. The electrical machine is at least one of a transverse flux machine or a commutated flux machine.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 2A illustrates an exemplary axial gap configuration in accordance with an exemplary embodiment;

FIG. 2B illustrates an exemplary radial gap configuration in accordance with an exemplary embodiment;

FIG. 3A illustrates an exemplary cavity engaged configuration in accordance with an exemplary embodiment;

FIG. 3B illustrates an exemplary face engaged configuration in accordance with an exemplary embodiment;

FIG. 7D illustrates cogging torque waveforms of an exemplary polyphase device configured with a zero phase offset in accordance with an exemplary embodiment.

DETAILED DESCRIPTION

Figure 1B:
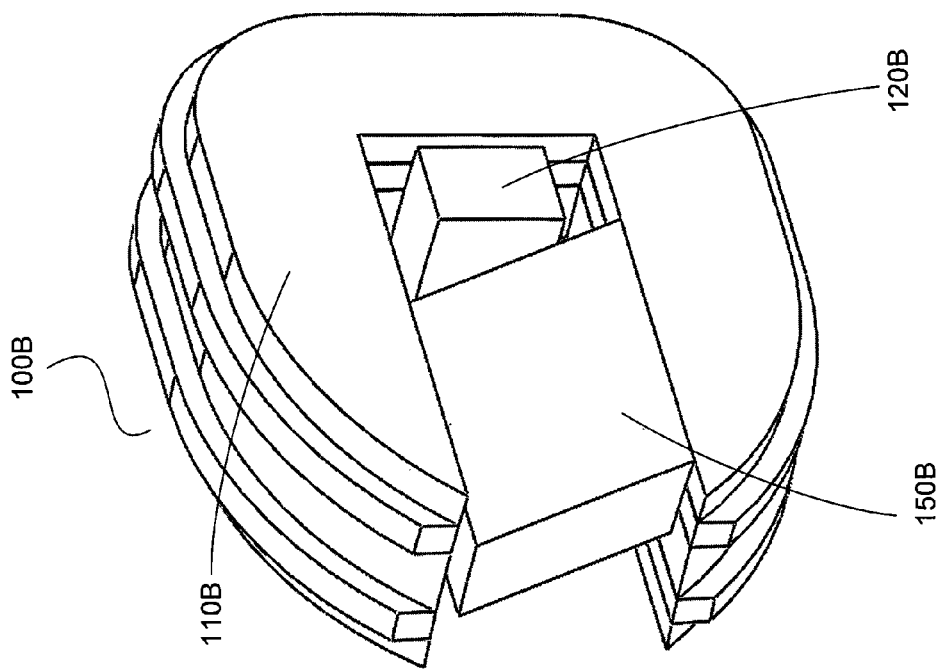
FIG. 1B illustrates an exemplary commutated flux machine in accordance with an exemplary embodiment.
Figure 1A:
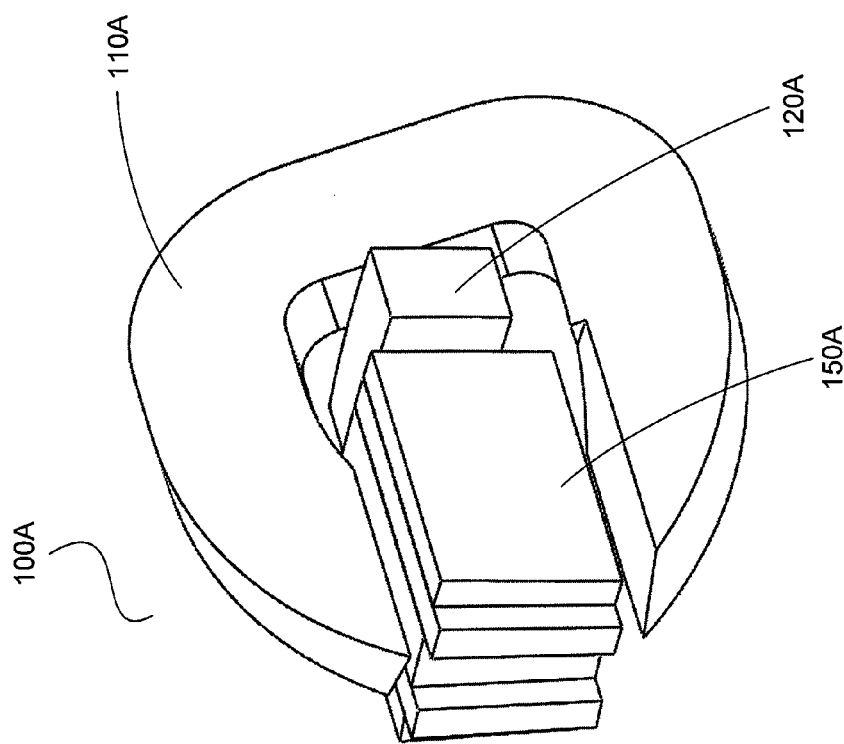
FIG. 1A illustrates an exemplary transverse flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for cogging torque reduction and magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example conventional AC synchronous motors, suffer from various deficiencies. For example, many prior electric motors have high peak cogging torque, for example peak cogging torque in excess of one-tenth (1/10) of the output torque of the motor, and thus are prone to excessive vibration and/or noise, particularly at high RPM operation. Additionally, many prior electric motors have cogging torque waveforms which are at least partially non-sinusoidal, making the peak cogging torque of the motor difficult to reduce, particularly when summing the cogging torque contributions of multiple phases in a polyphase motor.

Additionally, many prior electric motors have at least partially non-sinusoidal back EMF waveforms. Consequently, when these electric motors are driven by a generally sinusoidal input, the resulting torque produced by the motor varies as the motor rotates—a condition commonly known as torque ripple.

Even prior transverse flux machines and/or commutated flux machines have been unable to overcome these difficulties. For example, certain prior transverse flux machines have suffered from comparatively high cogging torque. Still others have cogging torque waveforms that depart substantially from ideal sinusoids. Additionally, prior approaches for reducing cogging torque have often resulted in significantly increased complexity and/or expense of the resulting transverse flux machine and/or commutated flux machine. Moreover, certain prior transverse flux machines have been configured with back EMF waveforms that are substantially non-sinusoidal, resulting in increased torque ripple when these transverse flux machines are driven by an approximately sinusoidal input.

In contrast, various of these issues with cogging torque and/or back EMF can be reduced and/or minimized by utilizing a transverse flux machine and/or commutated flux machine configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3C:
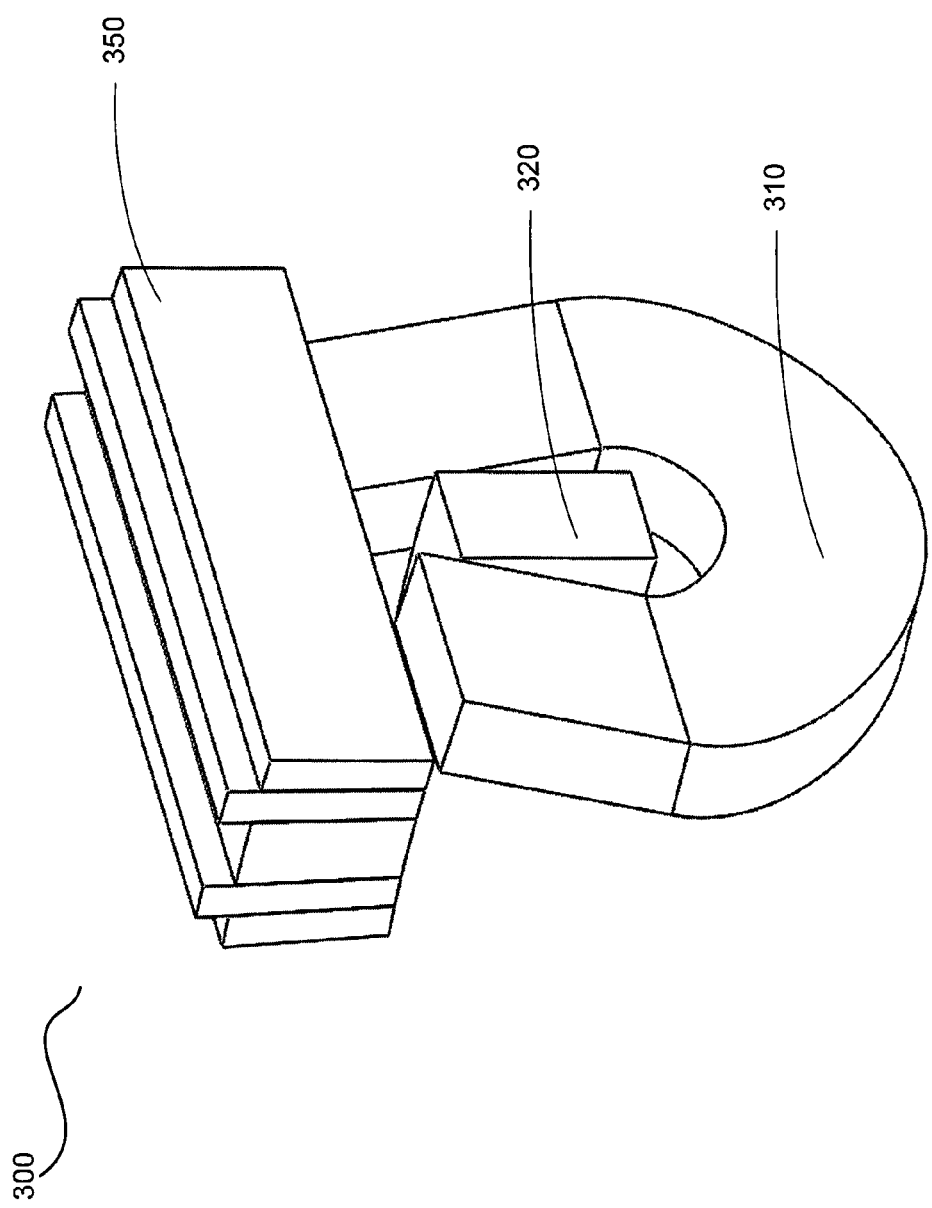
FIG. 3C illustrates an exemplary face engaged transverse flux configuration in accordance with an exemplary embodiment.

With reference now to FIG. 3A, a flux switch 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. For example, in an exemplary embodiment, with reference to FIG. 3C, a transverse flux machine 300 comprises a coil 320 at least partially surrounded by stator 310. Stator 320 is face engaged with rotor 350 in an axial gap configuration.

Figure 4A:
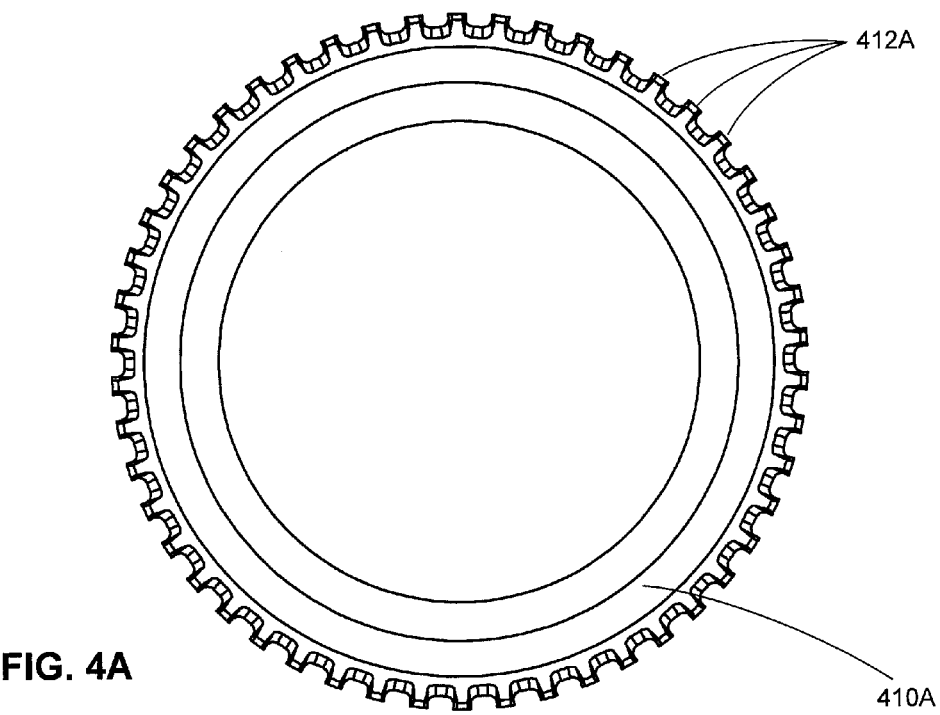
FIG. 4A illustrates an exemplary stator portion having equally distributed stator tooth spacing in accordance with an exemplary embodiment.
Figure 4B:
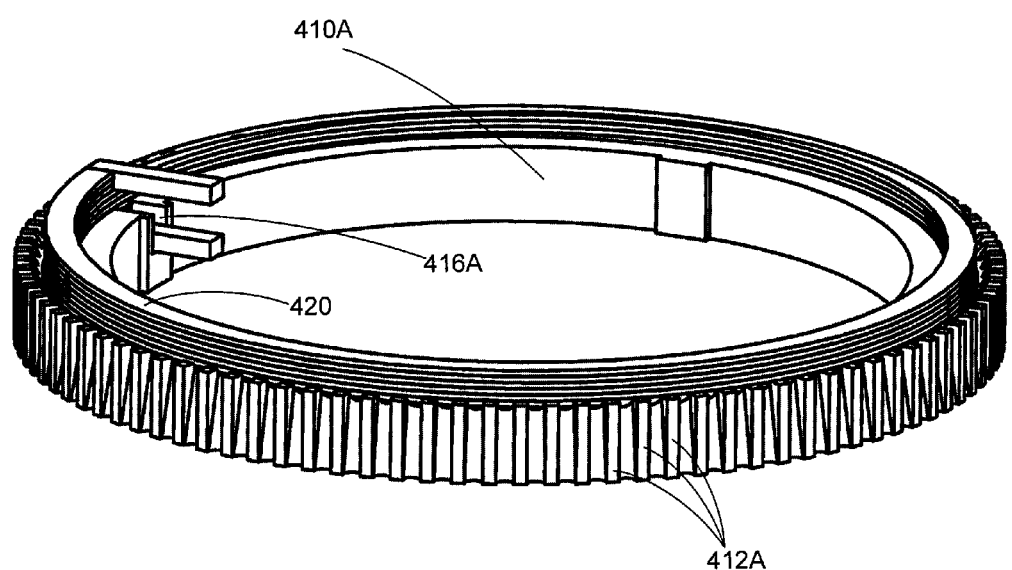
FIG. 4B illustrates the stator portion of FIG. 4A coupled to a coil in accordance with an exemplary embodiment.
Figure 4C:
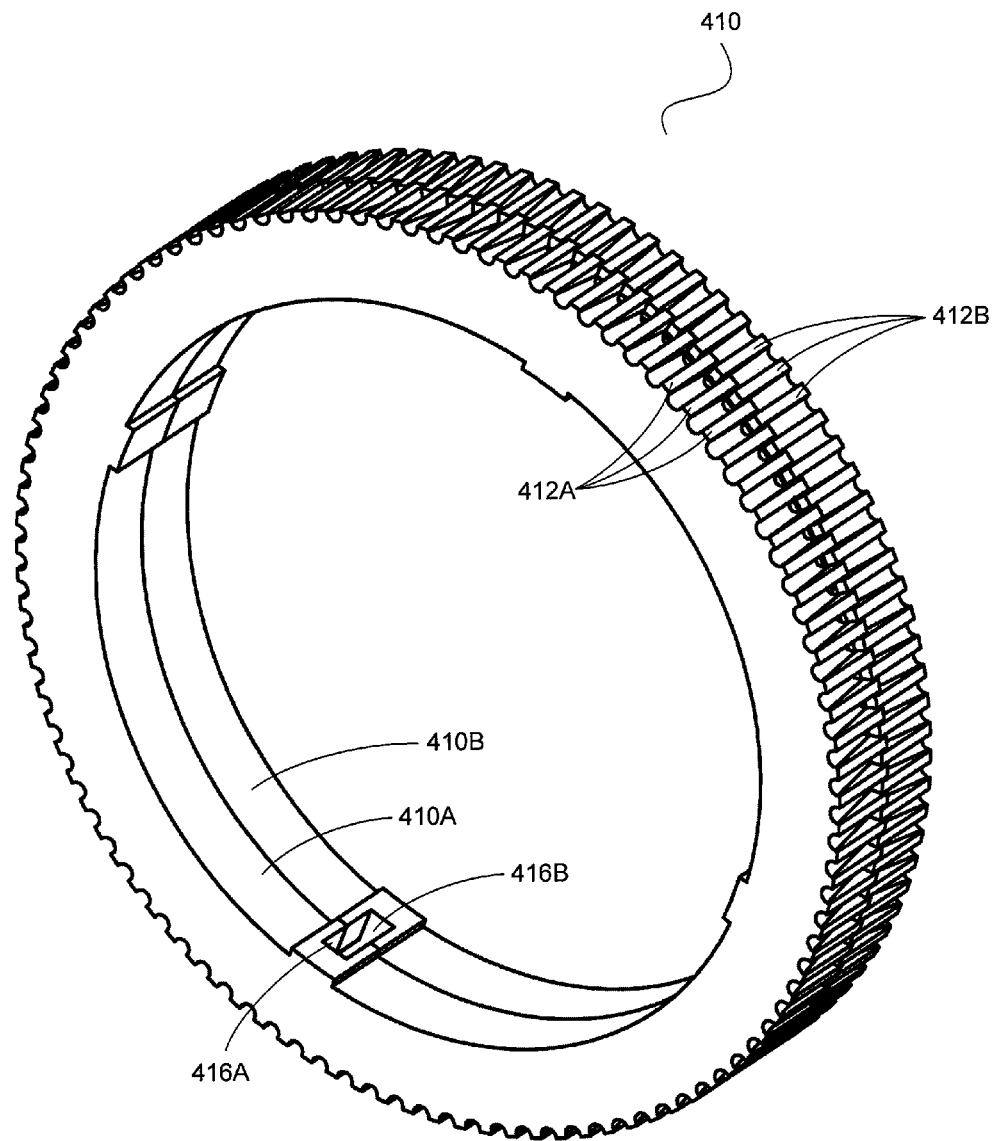
FIG. 4C illustrates two exemplary stator portions coupled to form a stator assembly in accordance with an exemplary embodiment.

With reference now to FIGS. 4A-4C, in accordance with an exemplary embodiment a stator portion 410A comprises a generally ring-shaped structure having a set of stator "teeth" 412A. In a transverse flux machine, at least part of stator portion 410A is configured to act as a flux switch for a rotor. For example, one or more teeth 412A of the set of stator teeth, or portions thereof, may each act as a flux switch.

In accordance with various exemplary embodiments, the areas between stator teeth 412A may be considered to be "gaps" or "trenches" and may comprise various shapes. For example, a trench may comprise a cylindrical shape, an elliptical shape, a triangular shape, a rectangular shape, a trapezoidal shape, and/or any suitable shape(s). Similarly, the stator teeth 412A may comprise various shapes. For example, a stator tooth 412A may comprise a rectangular shape, a triangular shape, a square shape, a cubic shape, a tapered shape, and/or any other suitable shape or geometries configured to allow stator tooth 412A to act as a flux switch.

Stator portion 410A and/or stator teeth 412A may comprise any suitable materials configured to conduct magnetic flux. For example, stator portion 410A may comprise silicon steel, powdered metals, plated powdered metals, soft magnetic composites, amorphous metals, nanocrystalline composites, iron cobalt alloys, and/or the like and/or combinations of the same. In an exemplary embodiment, stator portion 410A may be formed by molding a desired shape from powdered metal or other suitable material. In another exemplary embodiment, stator portion 410A may be formed by removing material from a generally ring-shaped piece of monolithic material (e.g., silicon steel), for example by machining. Moreover, stator portion 410A may be cast, pressed, sintered, die-cut, machined, stamped, bonded, laminated, polished, smoothed, bent, molded, plated, coated, and/or otherwise shaped and/or formed via any suitable method and/or apparatus.

With reference now to FIG. 4B, in various exemplary embodiments stator portion 410A may be configured to at least partially enclose a coil 420. For example, stator portion 410A may be configured with a trench, cavity, or other space wherein a portion of coil 420 may be placed. Additionally, stator portion 410A may be configured with one or more access holes 416A whereby coil 420 may pass into and/or out of stator portion 410A or otherwise be coupled to external electric components, for example in order to provide energizing current to coil 420 and/or receive induced current from coil 420.

With reference now to FIG. 4C, in accordance with various exemplary embodiments two similar stator portions 410A and 410B may be brought together in order to at least partially surround or enclose coil 420 (as depicted in FIG. 4B). In this manner, stator portions 410A and 410B may form a stator assembly 410. In an exemplary embodiment, stator teeth 412A and stator teeth 412B are interleaved when stator portions 410A and 410B are brought together around coil 420. In this manner, stator assembly 410 is configured with a set of alternating flux switches formed by stator teeth 412A and stator teeth 412B. An electrical connection to coil 420 within stator assembly 410 is provided via access holes 416A and 416B.

Moreover, in various exemplary embodiments stator assembly 410 is configured as a "multipath" stator assembly. In general, a multipath stator assembly for a transverse flux machine may comprise any structure, assembly, and/or mechanism or device configured to provide a plurality of flux paths between a plurality of first flux concentrating rotor portions and a plurality of second flux concentrating rotor portions having an opposite polarity. Stated another way, a multipath stator assembly can provide a "many to many" flux switch configuration for a transverse flux machine, wherein flux may be conducted from any of the first flux concentrating rotor portions to any of the second flux concentrating rotor portions having an opposite polarity.

Figure 4D:
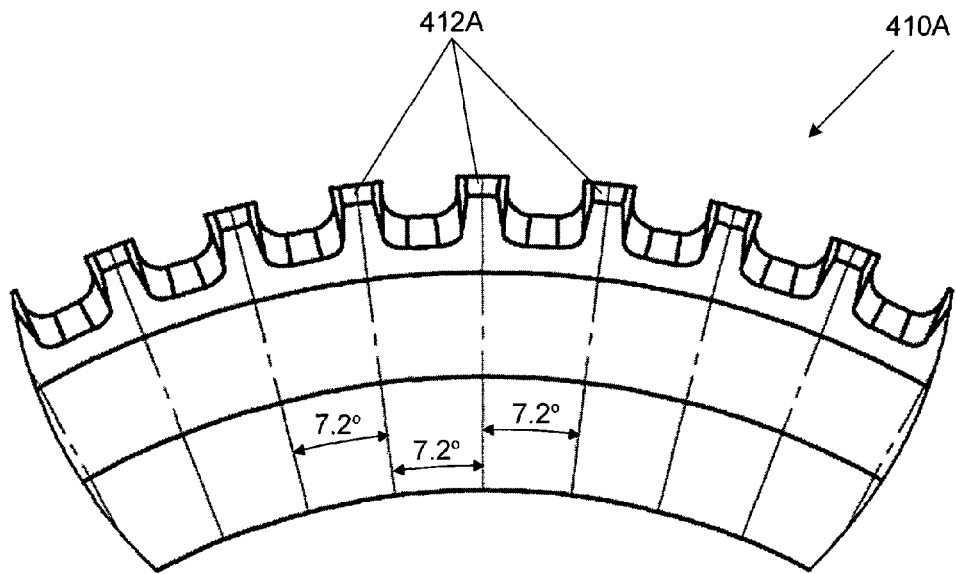
FIG. 4D illustrates equally distributed stator tooth spacing in accordance with an exemplary embodiment.

With reference now to FIG. 4D, in accordance with an exemplary embodiment each of stator teeth 412A may be evenly distributed about the circumference of stator portion 410A. For example, an exemplary stator portion 410A may be configured with 50 stator teeth 412A. When evenly distributed about the circumference of stator portion 410A, the stator teeth 412A are thus spaced with an angular distance of about 7.2° center-to-center (360° divided by 50=7.2°). As used herein, the "even distribution angular distance" may be considered to be the center-to-center angular distance between adjacent stator teeth (for example, between adjacent stator teeth 412A on stator portion 410A) having a value of (360/X) degrees, where X is the total number of stator teeth. Stator teeth or other flux switches configured according to the even distribution angular distance may be considered to be "evenly distributed". Stated another way, the "even distribution angular distance" may be considered to be the center-to-center angular distance between successive flux concentrators that have a common polarity (or successive magnetic poles having a common polarity) in a transverse flux machine and/or commutated flux machine. In general, under this exemplary way of calculating, the "even distribution angular distance" will have a value equal to 720 degrees divided by the number of poles (or 360 degrees divided by the number of pole pairs) in the electrical machine.

In an exemplary embodiment, stator portion 410A having evenly distributed stator teeth 412A is coupled to a similar stator portion 410B having evenly distributed stator teeth 412B to form stator assembly 410 having evenly distributed flux switches. In stator assembly 410, stator teeth 412A and 412B act as flux switches. Stator teeth 412A and 412B thus provide a plurality of flux paths from a first set of flux concentrators in a rotor having alternating permanent magnets and flux concentrators, to a second set of flux concentrators the rotor having an opposite polarity. Stator assembly 410 may thus be utilized in connection with the rotor in order to form an operational transverse flux machine.

Figure 4E:
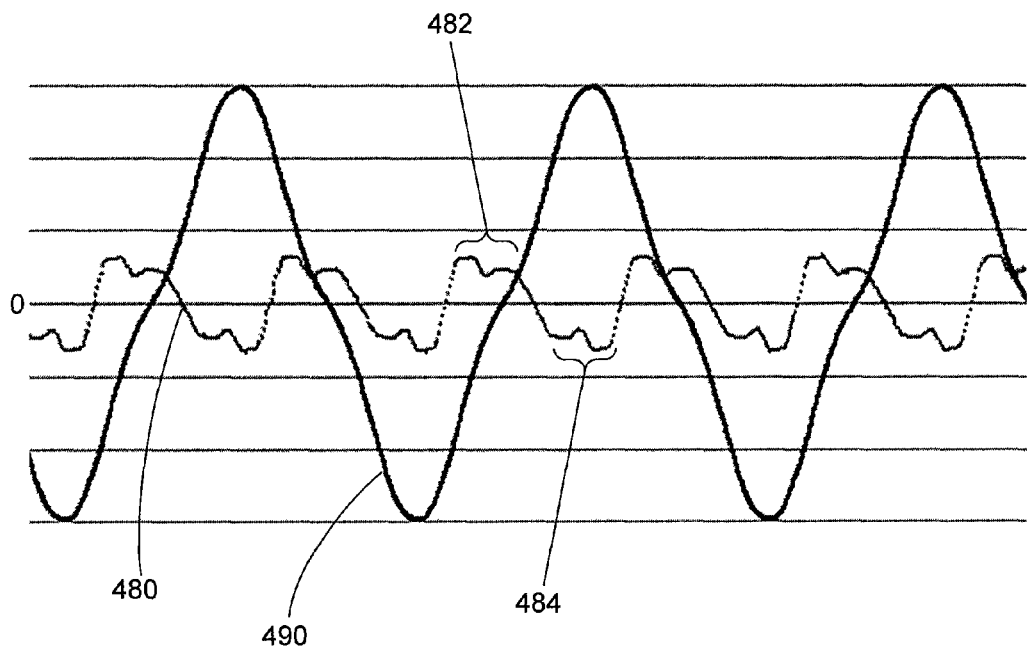
FIG. 4E illustrates cogging torque and back EMF waveforms produced by the exemplary stator assembly of FIG. 4C in accordance with an exemplary embodiment.

Turning to FIG. 4E, in accordance with an exemplary embodiment, operation of stator assembly 410 in connection with coil 420 and rotor 450 results in operational behavior of transverse flux machine 400 which may be at least partially characterized by cogging torque waveform 480 and back electromotive force (EMF) waveform 490. As can be seen, cogging torque waveform 480 contains significant deviations from an ideal sinusoid, for example at sections 482 and 484 of cogging torque waveform 480. Stated another way, cogging torque waveform 480 contains significant harmonic content other than the first harmonic (e.g., the magnitude of the second harmonic and/or higher harmonics exceed a percentage of the magnitude of the first harmonic, for example 5%). As a consequence of cogging torque waveform 480 having a non-zero peak magnitude, transverse flux machine 400 is subject to resulting operational noise and/or vibration.

Figure 5A:
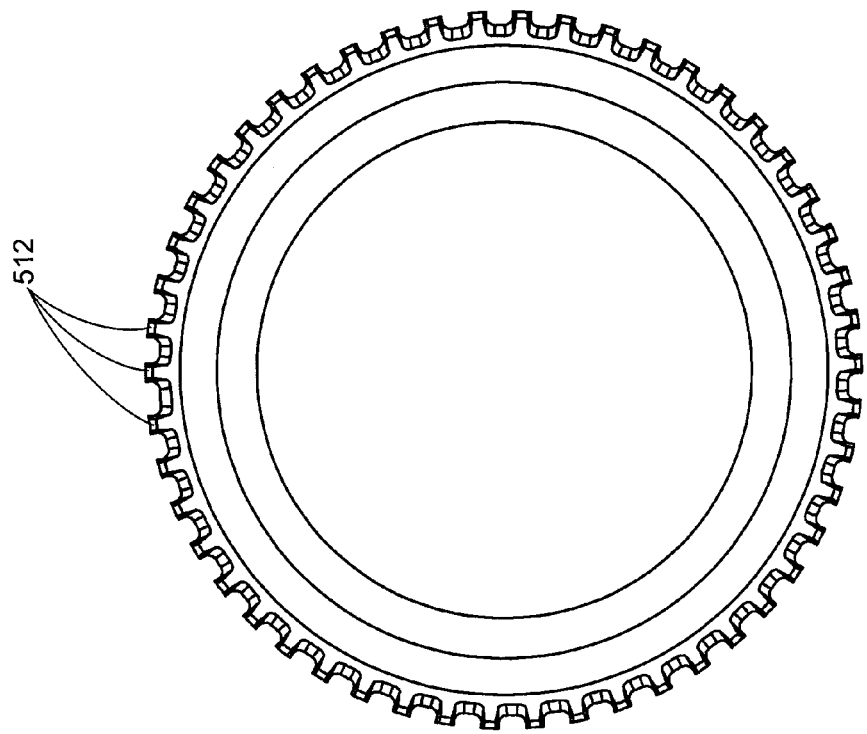
FIG. 5A illustrates an exemplary stator portion having unequally distributed stator tooth spacing in accordance with an exemplary embodiment.
Figure 5A:
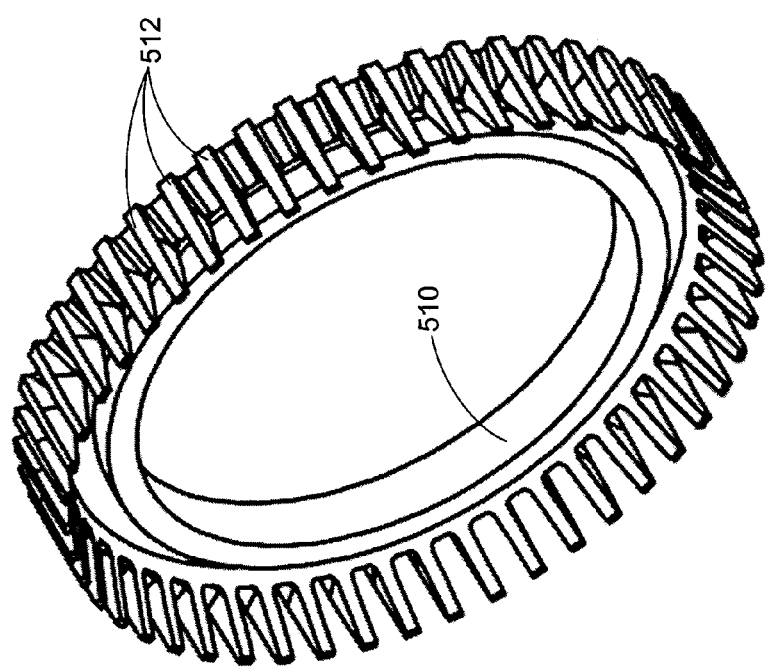

However, by utilizing a phase offset, for example a sixth-phase offset, in accordance with the principles of the present disclosure, the peak magnitude of a cogging torque waveform of an electrical machine may be reduced. For example, the peak magnitude of a cogging torque waveform may be reduced from about 6 Newton-meters to about 0.1 Newton-meters. Additionally, the cogging torque waveform of an electrical machine may be made more sinusoidal, for example by reducing the magnitude of the second harmonic and/or higher harmonics. Moreover, the back EMF waveform of an electrical machine may be made more sinusoidal, for example by reducing the magnitude of the second harmonic and/or higher harmonics. Turning now to FIG. 5A, in accordance with an exemplary embodiment, a stator portion 510 is configured with a number of stator teeth 512. Stator portion 510 may be similar to stator portion 410A and/or 410B, and stator teeth 512 may be similar to stator teeth 412A and/or 412B as discussed hereinabove. However, stator teeth 512 are distributed about stator portion 510 in a different manner than stator teeth 412A are distributed about stator portion 410A. Specifically, stator teeth 512 are not evenly distributed about the circumference of stator portion 510.

Figure 5B:
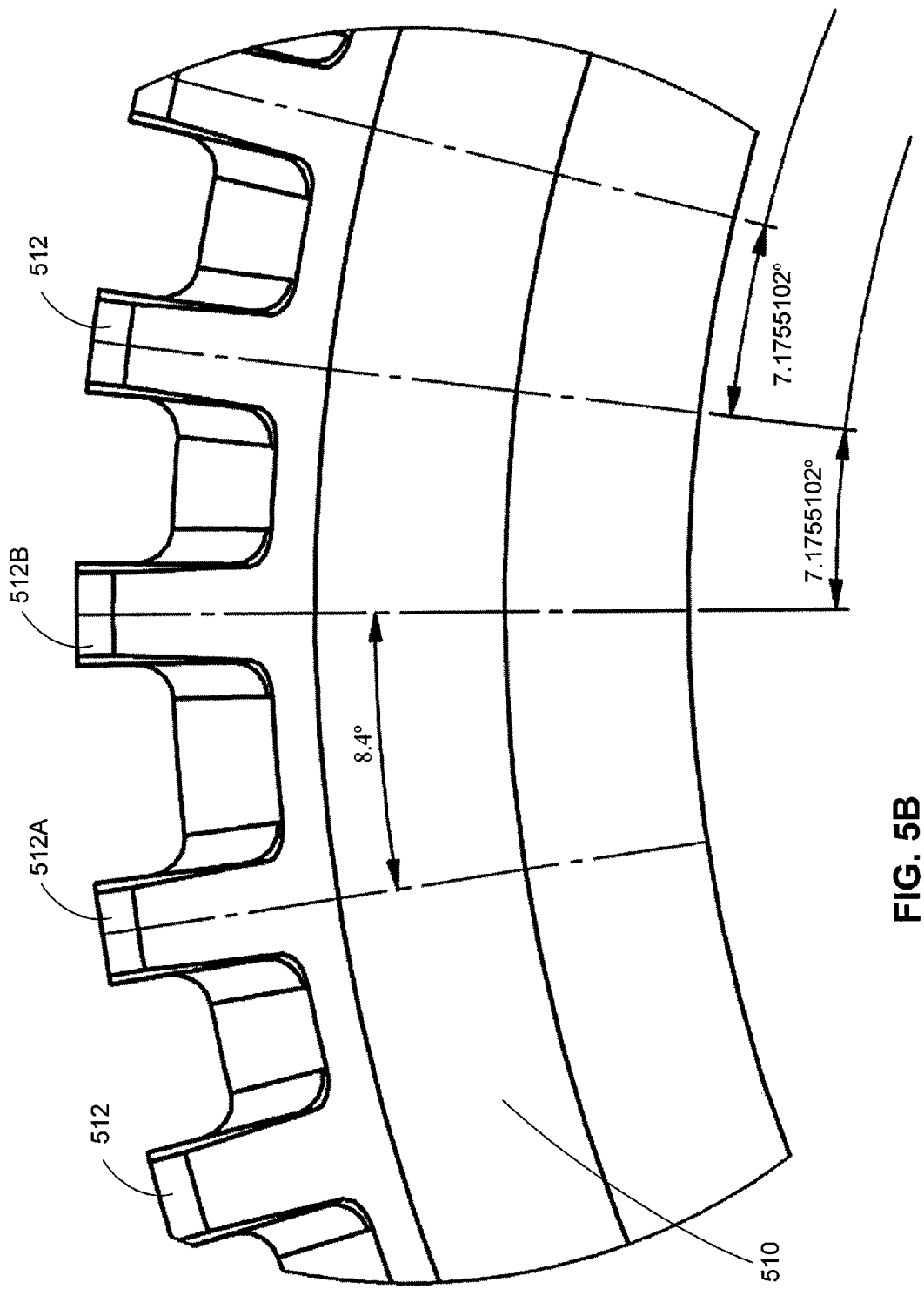
FIG. 5B illustrates unequally distributed stator tooth spacing according to a sixth-phase offset in accordance with an exemplary embodiment.

With reference now to FIG. 5B, in accordance with an exemplary embodiment, stator teeth 512 are not evenly distributed about the circumference of stator portion 510. Instead, an "offset" is applied to at least one stator tooth 512. For example, an exemplary stator portion 510 may be configured with 50 stator teeth 512. Were stator teeth 512 to be evenly distributed about the circumference of stator portion 510, the stator teeth 512 would be spaced with an angular distance of 7.2° center-to-center (360° divided by 50=7.2°) therebetween. Instead, two stator teeth 512A and 512B are separated by the even distribution angular distance plus an increased angular distance equal to one-sixth (⅙) of the even distribution angular distance. In this example, stator teeth 512A and 512B are separated by an angular distance of 7.2°+(⅙*7.2°)=8.4° center-to-center. In order to accommodate the increased angular distance between stator teeth 512A and 512B, one or more of the remaining stator teeth 512 on stator portion 510 are moved slightly closer together when compared to the even distribution angular distance. For example, the remaining stator teeth 512 may each be shifted a similar angular distance in order to offset the increased angular spacing between stator teeth 512A and 512B.

In an exemplary embodiment, the additional angular distance of 1.2° (which was added to the distance between stator teeth 512A and 512B) is compensated for by equally distributing a slight spacing reduction across the 49 other angular distances between stator teeth 512. The spacing reduction results in a stator tooth angular distance of 7.2°−(1.2°/49)=7.17551020° center-to-center for all spacings except for the spacing between stator tooth 512A and stator tooth 512B. Thus, of the 50 inter-tooth spacings on stator portion 510, 49 are configured with an angular distance of 7.17551020°, and one is configured with an angular distance of 8.4°. Stated generally, one of the spacings has been expanded by about one-sixth of the even distribution angular distance, and the remaining spacings have been about equally compressed in order to accommodate the one spacing which has been increased.

The above-illustrated "sixth-phase offset" spacing principle may be applied to any suitable number of stator teeth, motor poles, and/or the like. For example, in an exemplary stator portion having 60 teeth, the even distribution angular distance would be 360°/60=6° center-to-center. Thus, to implement a sixth-phase offset, two adjacent stator teeth may be spaced 6°+(6°*⅙)=7° center-to-center apart, while the remaining teeth may be spaced 6°−((6°*⅙)/59)=5.98305° center-to-center apart. In another exemplary stator portion having 30 teeth, the even distribution angular distance would be 360°/30=12° center-to-center. Thus, two adjacent stator teeth may be spaced 12°+(12°*⅙)=14° center-to-center apart, while the remaining teeth may be spaced 12°−((12°*⅙)/29)=11.931034° center-to-center apart. Moreover, any suitable number of stator teeth and/or any suitable even distribution angular distance may be utilized.

In addition to the foregoing sixth-phase offset, a spacing offset in integer multiples of one-sixth of the even distribution angular distance may also be implemented. For example, a one-third spacing (2*⅙), a one-half spacing (3*⅙), a two-thirds spacing (4*⅙), and/or other suitable spacing may be implemented. In one example, in an exemplary stator portion having 60 teeth, the even distribution angular distance would be 360°/60=6° center-to-center. Thus, if applying a one-third spacing, two stator teeth may be spaced 6°+(6°*⅓)=8° center-to-center apart, while the remaining teeth may be spaced 6°−((6°*⅓)/59)=5.966101° center-to-center apart. If applying a one-half spacing, two stator teeth may be spaced 6°+(6°*½)=9° center-to-center apart, while the remaining teeth may be spaced 6°−((6°*½)/59)=5.949152° center-to-center apart. Similar spacing approaches utilizing spacing in integer multiples of one-sixth of the even distribution angular distance may be applied to any suitable number of motor poles, stator teeth, and/or the like.

As used herein, in certain exemplary embodiments a "sixth-phase offset" may be considered to mean a configuration of motor poles (and/or flux switches and/or flux concentrators) in any transverse flux machine and/or commutated flux machine wherein the angular distance between two adjacent motor poles (and/or flux switches and/or flux concentrators) of a common polarity is equal to the even distribution angular distance between motor poles (and/or flux switches and/or flux concentrators) of a common polarity, increased by an angular distance equal to a nonzero, positive integer multiple of one-sixth of the even distribution angular distance, and wherein the angular distance between at least a portion of the remaining adjacent motor poles (and/or flux switches and/or flux concentrators) of a common polarity is decreased by a pro-rated fraction of the increased angular distance.

In various exemplary embodiments, a sixth-phase offset or other offset may be calculated according to the following generalized formula: shift angle=((720/poles)*(# of switches−shift−1))/(# of switches−1)

wherein:

"shift angle" is the even distribution angular distance less the pro-rated fraction of the increased angular distance;

"poles" is the number of poles in the transverse flux machine, commutated flux machine, or other electrical machine;

"# of switches" is the number of flux switches over which the sixth-phase offset or other offset is to be distributed; and "shift" is the desired offset, for example ⅙, ⅓, ⅕, etc.

For example, in a transverse flux machine having 100 poles, when the offset is desired to be spread across the entire transverse flux machine, the # of switches would typically be 50—one for every pole pair. If, in contrast, the offset was desired to be spread across only half of the transverse flux machine, the # of switches would be 25.

In one exemplary embodiment, a 100 pole transverse flux machine is configured with a ⅙ offset spread across the entire transverse flux machine. Thus, the even distribution angular distance is 7.2° (720° divided by 100 poles). One-sixth of the even distribution angular distance is 1.2° (7.2°/6). Using the above formula, we obtain the appropriate spacing for the remaining poles as: shift angle=((720/100)*(50−⅙−1))/(50−1)=7.17551020°. Thus, to implement a sixth-phase offset distributed across an entire transverse flux machine with 100 poles, the center-to-center spacing between two adjacent poles is 8.4° (7.2°+1.2°), and the center-to-center spacing between each of the remaining adjacent poles is 7.17551020°. Similar approaches may be followed for any number of poles in a transverse flux machine, commutated flux machine, and/or other electrical machine.

As noted previously, a sixth-phase offset or other offset may be spread across an entire electrical machine; alternatively, a sixth-phase offset or other offset may be spread across only a portion of an electrical machine. Additionally, multiple offsets may be present in an electrical machine, each spread across only a portion of the electrical machine. In various exemplary embodiments, a "single" sixth-phase offset may be considered to be a sixth-phase offset implemented by adjusting the spacing of all poles (and/or flux switches and/or flux concentrators) in a transverse flux machine and/or commutated flux machine. Additionally, a "double" sixth-phase offset may be implemented by adjusting the spacing of about half of the poles (and/or about half of the flux switches and/or flux concentrators) in a transverse flux machine and/or commutated flux machine according to a sixth-phase offset, and also adjusting the spacing of the remaining half according to another sixth-phase offset. Stated another way, in a "double" sixth-phase offset configuration, a first sixth-phase offset is distributed across only a part of the transverse flux machine and/or commutated flux machine, and a second sixth-phase offset is distributed across the remaining part of the transverse flux machine and/or commutated flux machine. A "triple" sixth-phase offset and higher sixth-phase offsets may also be implemented. Use of sixth-phase offsets greater than a single sixth-phase offset may be desirable, for example in order to reduce alignment errors due to cumulative manufacturing and/or assembly tolerance issues.

Additionally, in various exemplary embodiments, a sixth phase offset may be implemented with respect to each coil in a polyphase device. For example, a particular polyphase device may be configured with a first coil, a second coil, and a third coil, each of which traverses only a portion of the circumference of the polyphase device. A sixth-phase offset may be implemented by adjusting the spacing of flux switches associated with the first coil. Another sixth-phase offset may be implemented by adjusting the spacing of flux switches associated with the second coil. Yet another sixth-phase offset may be implemented by adjusting the spacing of flux switches associated with the third coil. Moreover, a sixth-phase offset may also be implemented by adjusting the spacing of poles (and/or flux concentrators) rather than and/or in addition to adjusting the spacing of flux switches. The sixth-phase offsets associated with each coil may be similar; alternatively, the sixth-phase offsets may differ from coil to coil. Additional details regarding polyphase transverse flux machines and/or commutated flux machines are disclosed in U.S. patent application Ser. No. 12/611,737 filed on Nov. 3, 2009, Now U.S. Pat. No. 7,868,508 entitled "POLYPHASE TRANSVERSE AND/OR COMMUTATED FLUX SYSTEMS", the contents of which are hereby incorporated by reference in their entirety.

In various exemplary embodiments, manufacturing tolerances, materials properties, thermal variations, mechanical variations, and/or the like, may cause difficulty in implementing spacing in an accurate and/or precise manner. Accordingly, in certain exemplary embodiments a configuration of poles, flux switches, and/or flux concentrators in a transverse flux machine and/or commutated flux machine may be considered to be an implementation of a "sixth-phase offset" concept (in accordance with principles of the present disclosure) when angular distances between motor poles, flux switches, and/or flux concentrators are consistent with a calculated sixth-phase offset angular distance when manufacturing tolerances and/or other process variations are taken into account. Stated another way, even though any particular poles, flux switches, and/or flux concentrators may not be spaced exactly according to a sixth-phase offset, on average the spacing between poles, flux switches, and/or flux concentrators can approximate suitable spacing according to a sixth-phase offset.

In an exemplary embodiment, with reference to FIGS. 5A and 5B, a first stator portion 510 having stator teeth 512 configured with a sixth-phase offset is coupled to another stator portion 510 also having stator teeth 512 configured with a sixth-phase offset, to form a stator assembly having sixth-phase offset flux switches. The stator assembly may then be utilized in connection with a coil and a rotor having alternating permanent magnets and flux concentrators in order to form an operational transverse flux machine.

By utilizing a sixth-phase offset between certain stator teeth, transverse flux machine 500 achieves a cogging torque waveform having a reduced peak magnitude and increased sinusoidality. Moreover, utilizing a sixth-phase offset, transverse flux machine 500 achieves a cogging torque waveform that has a reduced peak magnitude and increased sinusoidality as compared to a different offset (for example, an offset greater than or smaller than a sixth-phase offset). As used herein, "increased sinusoidality" and similar terminology may be considered to mean a closer approach to an ideal sinusoid (for example, as characterized by reduced magnitude of the second harmonic and/or higher harmonics), and "decreased sinusoidality" and similar terminology may be considered to mean further departure from an ideal sinusoid (for example, as characterized by increased magnitude of the second harmonic and/or higher harmonics).

Figure 5C:
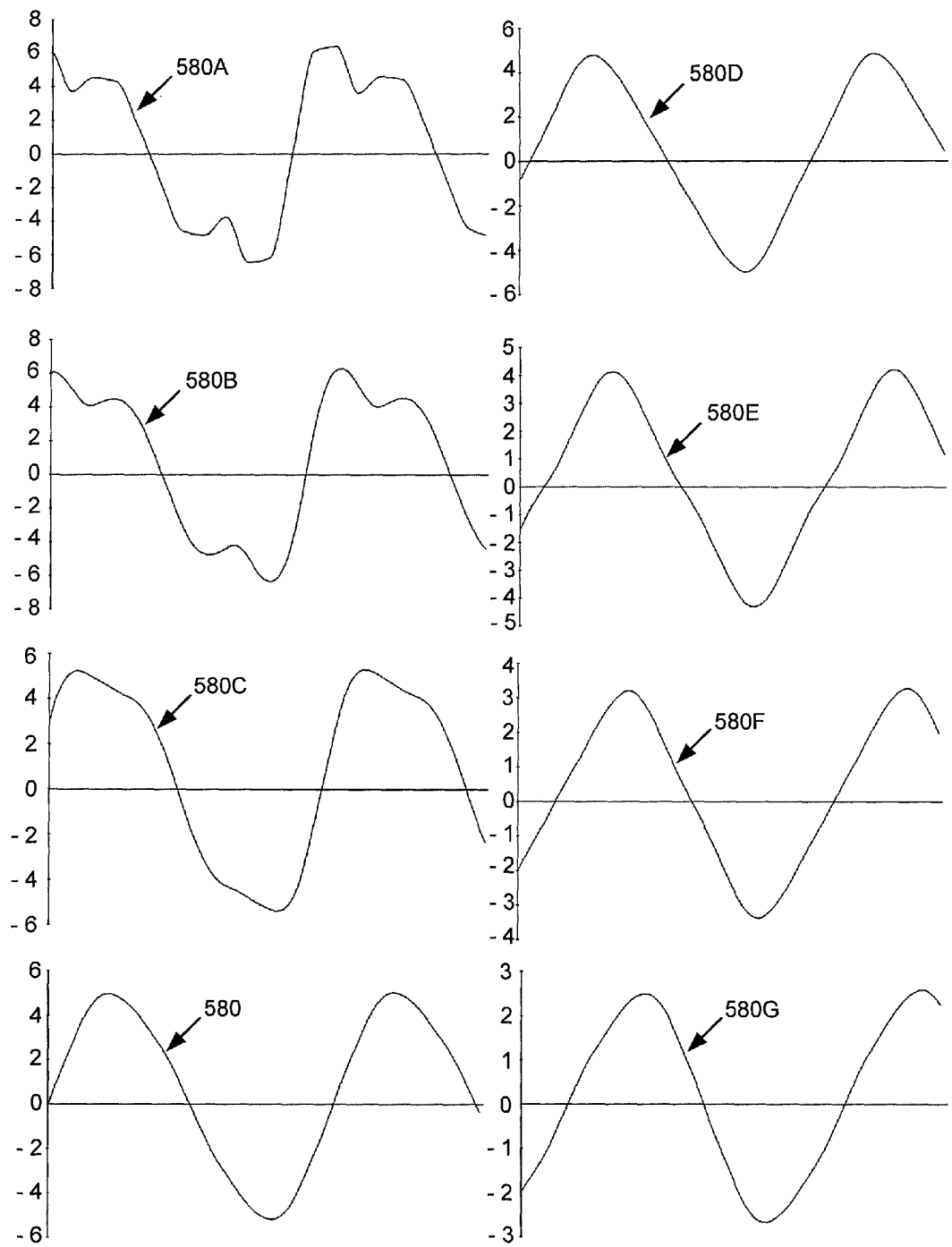
FIG. 5C illustrates exemplary cogging tooth waveforms produced by varying an offset in accordance with an exemplary embodiment.

Turning now to FIG. 5C, in accordance with various exemplary embodiments, a cogging torque waveform of transverse flux machine 500 varies as a phase offset in transverse flux machine 500 is varied. Cogging torque waveforms corresponding to various offsets in an exemplary 100-pole transverse flux machine 500 are illustrated, with the magnitude of the waveforms in Newton-meters.

Cogging torque waveform 580A is representative of operation of transverse flux machine 500 when a zero phase offset is implemented (stated another way, when all stator teeth are spaced center-to-center according to the even distribution angular distance). Cogging torque waveform 580B is representative of implementation of a twentieth-phase offset (1/20, or 0.05 of the even distribution angular distance); cogging torque waveform 580C is representative of implementation of a ninth-phase offset (1/9, or 0.1111) of the even distribution angular distance; cogging torque waveform 580D is representative of implementation of a fifth-phase offset (1/5, or 0.2) of the even distribution angular distance; cogging torque waveform 580E is representative of implementation of a fourth-phase offset (1/4, or 0.25 of the even distribution angular distance); cogging torque waveform 580F is representative of implementation of a three-tenths-phase offset (3/10, or 0.3 of the even distribution angular distance); and cogging torque waveform 580G is representative of implementation of a third-phase offset (1/3, or 0.3333 of the even distribution angular distance). Additional details regarding these exemplary modeled cogging tooth waveforms, and corresponding exemplary modeled open-circuit RMS voltages generated in coil 520 of transverse flux machine 500 are presented in Table 1 below.

TABLE 1

| Cogging Tooth Waveform | Phase Offset | Cogging Torque Peak Magnitude (Newton-meters) | Cogging Torque RMS value (Newton-meters) | Open Circuit Voltage RMS value (Volts) |
| --- | --- | --- | --- | --- |
| 580A | 0 | 6.38 | 4.52 | 18.79 |
| 580B | 1/20 (0.05) | 6.26 | 4.38 | 18.70 |
| 580C | 1/9 (0.1111) | 5.30 | 3.96 | 18.36 |
| 580 | 1/6 (0.1666) | 5.01 | 3.51 | 17.88 |
| 580D | 1/5 (0.2) | 4.83 | 3.21 | 17.51 |
| 580E | 1/4 (0.25) | 4.19 | 2.72 | 16.88 |

TABLE 1-continued

| Cogging Tooth Waveform | Phase Offset | Cogging Torque Peak Magnitude (Newton-meters) | Cogging Torque RMS value (Newton-meters) | Open Circuit Voltage RMS value (Volts) |
|---|---|---|---|---|
| 580F | 3/10 (0.3) | 3.28 | 2.17 | 16.15 |
| 580G | 1/3 (0.3333) | 2.58 | 1.78 | 15.60 |

Cogging torque waveform 580 is representative of implementation of a sixth-phase offset. Note that cogging torque waveform 580 is more sinusoidal than cogging tooth waveforms representative of phase offsets either greater or smaller than a sixth-phase offset. Additionally, note that the peak magnitude and the RMS value of cogging tooth waveform 580 are approximately 22% smaller than the corresponding values of cogging tooth waveform 580A (with a zero phase offset). Moreover, the open circuit voltage has declined only approximately 5%. Additionally, cogging torque waveform 580G is representative of a third-phase offset, which is an integer multiple of a sixth-phase offset (2*1/6=1/3). However, the open circuit RMS voltage associated with a third-phase offset is lower than that associated with a sixth-phase offset, as illustrated.

Figure 5D:
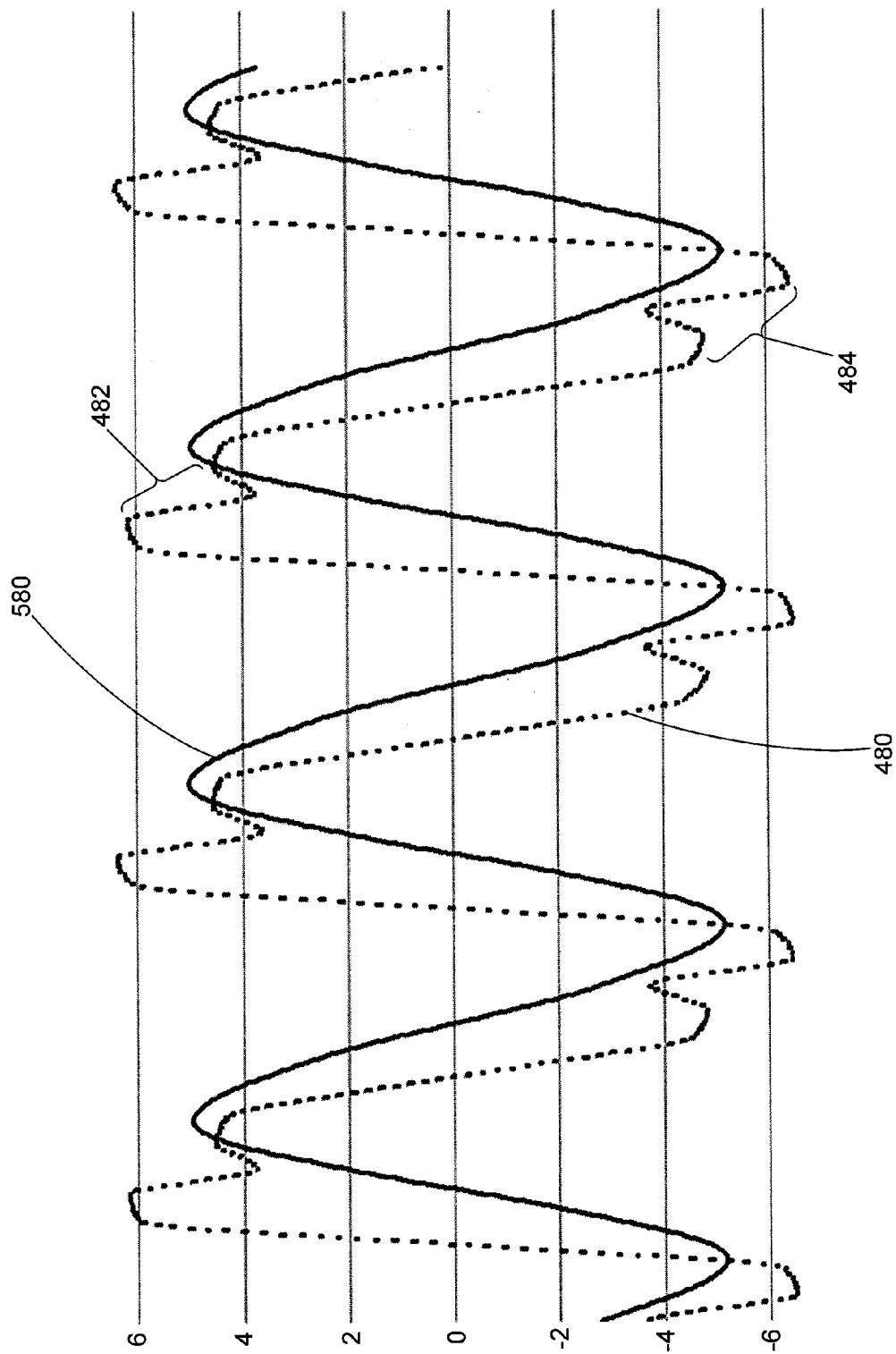
FIG. 5D illustrates an exemplary cogging torque waveform produced by the exemplary stator assembly of FIG. 4C, compared with an exemplary cogging torque waveform produced by an exemplary stator assembly configured with a sixth-phase offset in accordance with an exemplary embodiment.

Turning now to FIG. 5D, in accordance with an exemplary embodiment, a cogging torque waveform 580 is generated responsive to operation of transverse flux machine 500. Also illustrated for comparison purposes in FIG. 5D is cogging torque waveform 480 produced by transverse flux machine 400 (e.g., wherein a zero phase offset is utilized). As can be seen, cogging torque waveform 580 has lower peak magnitude than cogging torque waveform 480. Thus, vibration and noise during operation of transverse flux machine 500 are reduced.

Additionally, cogging torque waveform 580 is substantially more sinusoidal in character than cogging torque waveform 480, as non-sinusoidal areas 482 and 484 are substantially absent from cogging torque waveform 580. Thus, cogging torque associated with operation of stator assembly 510 within transverse flux machine 500 may be more easily balanced and/or reduced. For example, a particular transverse flux machine may be constructed from multiple stator assemblies 510, wherein each stator assembly 510 has a similar sinusoidal cogging torque waveform, but each stator assembly is offset by 120 degrees.

Figure 5E:
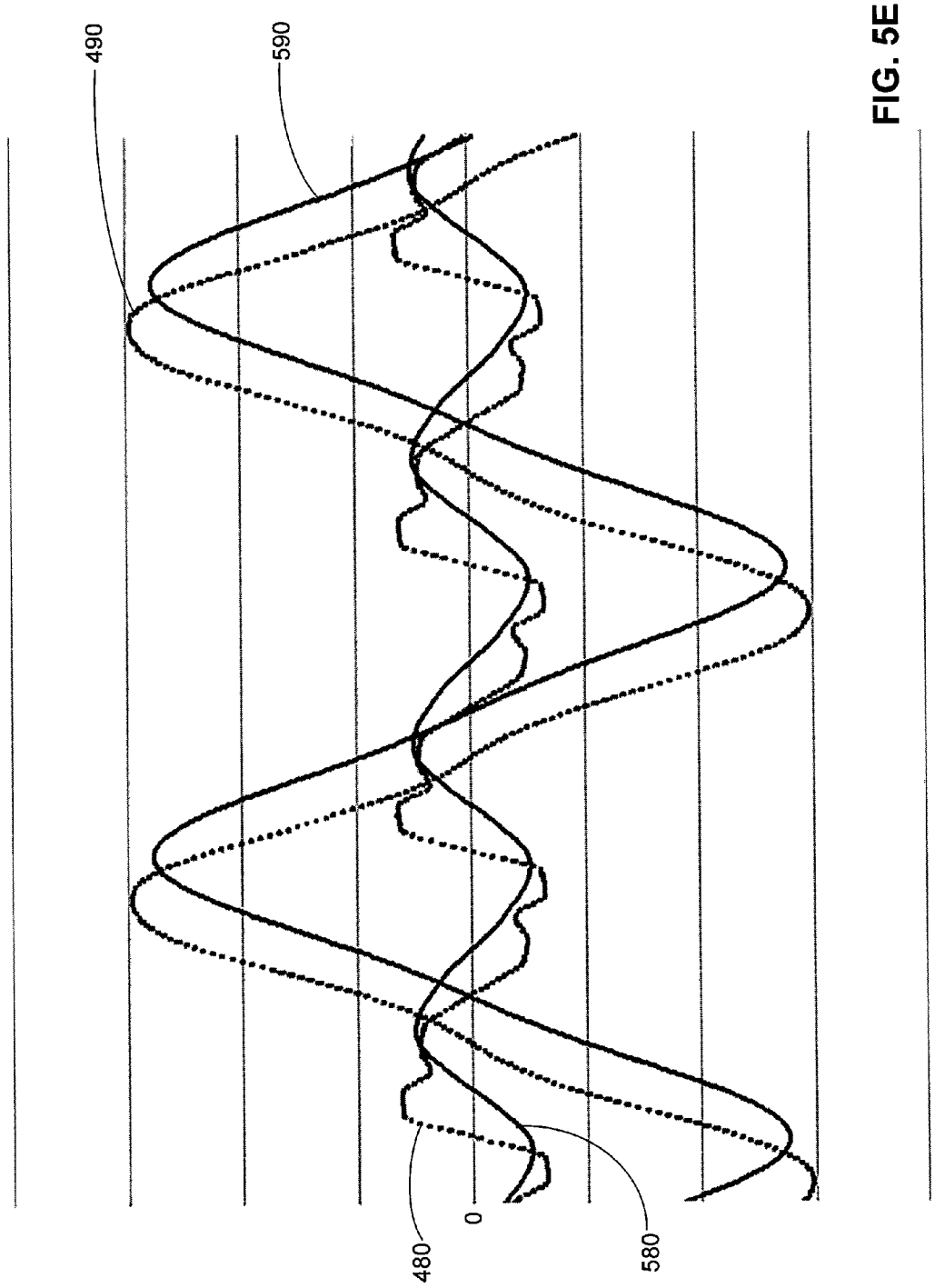
FIG. 5E illustrates exemplary cogging torque and back EMF waveforms produced by the exemplary stator assembly of FIG. 4C, compared with exemplary cogging torque and back EMF waveforms produced by an exemplary stator assembly configured with a sixth-phase offset in accordance with an exemplary embodiment.

With reference now to FIG. 5E, in accordance with an exemplary embodiment, implementing a sixth-phase offset in stator assembly 510 also affects the back EMF generated via operation of stator assembly 510. In an exemplary embodiment, back EMF waveform 590 is more sinusoidal than back EMF waveform 490. Thus, stator assembly 510 may be more easily integrated into a polyphase configuration than stator assembly 410, as sinusoidal waveforms are easier to control, characterize and/or combine, as suitable. Additionally, stator assembly 510 may generate less torque ripple when driven by a substantially sinusoidal input, as back EMF waveform 590 is more sinusoidal.

Additionally, back EMF waveform 590 has a reduced peak magnitude when compared to back EMF waveform 490. Thus, the maximum potential torque density achievable by transverse flux machine 500 is reduced. However, benefits associated with reduction in peak cogging torque may offset the downside of the reduced peak magnitude of the back EMF, particularly where lower noise operation and/or lower vibration operation are desirable. Additionally, benefits associated with the improved sinusoidality of back EMF waveform 590 may offset a downside of the reduced peak magnitude of the back EMF. For example, because back EMF waveform 590 is more sinusoidal, torque ripple is decreased. Additionally, because back EMF waveform 590 is more sinusoidal, it is easier for a controller to induce more optimal current waveforms into transverse flux machine 500.

Additionally, in various polyphase devices, the peak magnitude of cogging torque in the polyphase device may be greatly reduced at the trade-off of only a minor reduction in the peak magnitude of the back EMF of the polyphase device.

As illustrated above, in certain exemplary embodiments, principles of a sixth-phase offset may be achieved via configuring a transverse flux machine and/or commutated flux machine with an even distribution angular distance between motor poles (and/or flux switches and/or flux concentrators) of a common polarity, increased by an angular distance equal to a nonzero, positive integer multiple of one-sixth of the even distribution angular distance, and wherein the angular distance between at least a portion of the remaining adjacent motor poles (and/or flux switches and/or flux concentrators) of a common polarity is decreased by a pro-rated fraction of the increased angular distance. In other exemplary embodiments, principles of a sixth-phase offset may also be achieved by configuring a transverse flux machine and/or commutated flux machine with any suitable configuration of motor poles (and/or flux switches and/or flux concentrators), provided such configuration results in individual cogging torque waveforms within the transverse flux machine and/or commutated flux machine that are substantially evenly distributed across about one-sixth (1/6) of a voltage phase.

Figure 6:
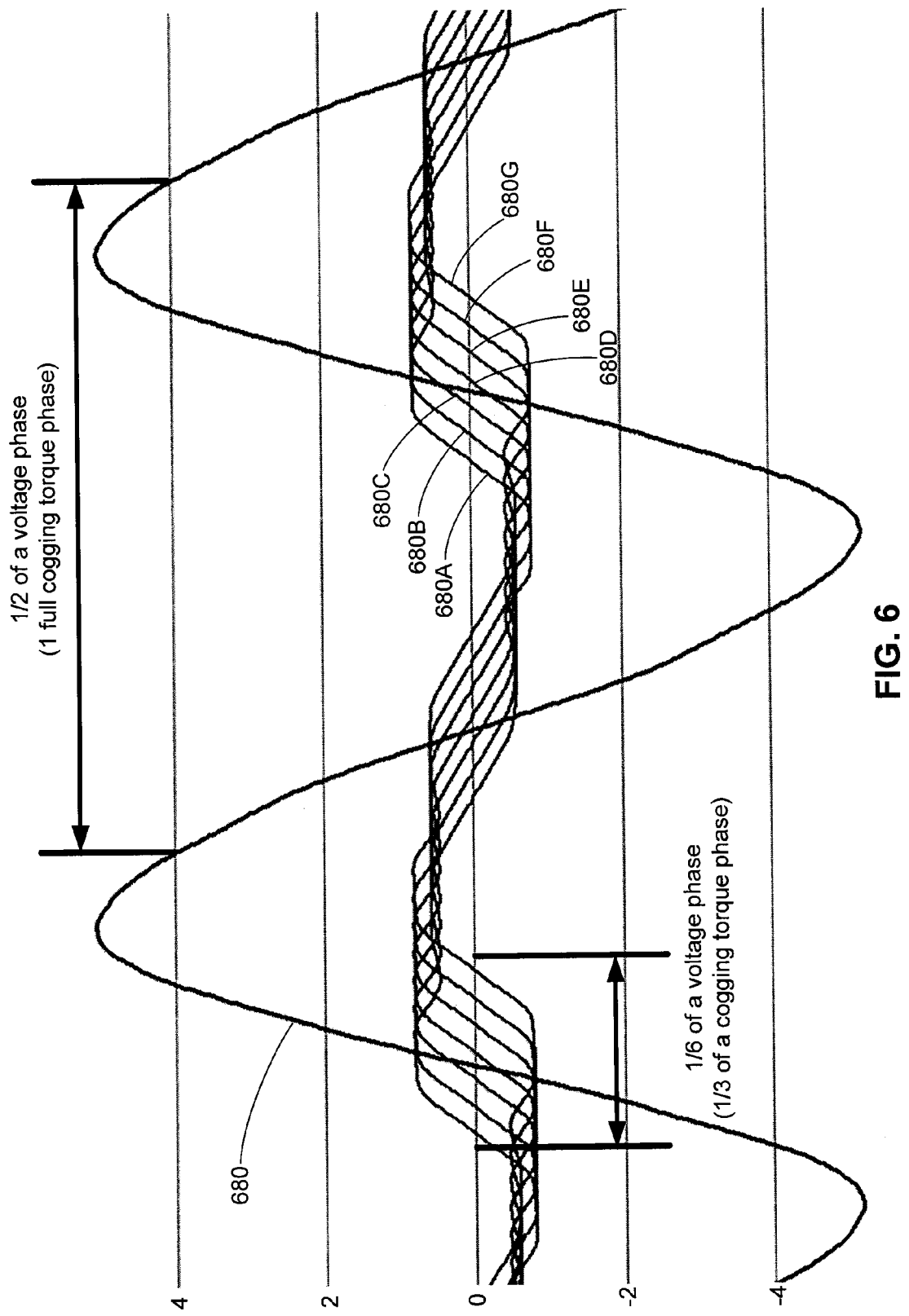
FIG. 6 illustrates exemplary cogging torque waveforms of an electrical machine, wherein the relationship among the cogging torque waveforms is independent of the physical relationship among the associated physical components.

For example, in various exemplary embodiments and with reference now to FIG. 6, a transverse flux machine is configured according to a sixth-phase offset. The transverse flux machine is configured to generate, upon operation, a cogging torque waveform 680. Cogging torque waveform 680 represents the sum of individual cogging torque waveforms 680A-680G arising from the changing reluctance of the magnetic flux paths within the transverse flux machine. Cogging torque waveforms 680A-680G are substantially evenly distributed across one-sixth of a voltage phase (one-third of a cogging phase) of the transverse flux machine.

In these exemplary embodiments, the physical components (e.g., magnets, flux concentrators, flux switches, and/or the like) of the transverse flux machine associated with each individual cogging torque waveform may be located independently from one another. For example, although cogging torque waveforms 680B and 680C are adjacent in phase as the transverse flux machine operates, the physical components generating cogging torque waveforms 680B and 680C may not be physically adjacent to one another within the transverse flux machine. Stated another way, the physical components generating cogging torque waveform 680B may be located in any suitable angular position within the transverse flux machine. Similarly, the physical components generating cogging torque waveform 680C may be located at any suitable angular position within the transverse flux machine. Generally stated, physical components associated with individual cogging torque waveforms which are adjacent in phase during operation of a transverse flux machine and/or commutated flux machine are not required to be physically adjacent within the transverse flux machine and/or commutated flux machine.

Additionally, in various exemplary embodiments a transverse flux machine and/or commutated flux machine may be configured according to a sixth-phase offset when certain individual cogging torque waveforms in the transverse flux machine and/or commutated flux machine overlap in phase.

For example, with reference again to FIG. 6, a transverse flux machine may be configured with two cogging torque waveforms in the place of the one cogging torque waveform illustrated as 680A (i.e., two cogging torque waveforms having substantially similar phase, magnitude, and other characteristics), two cogging torque waveforms in the place of the one cogging torque waveform illustrated as 680B, and so forth. Stated another way, the transverse flux machine may be configured with first physical components associated with cogging torque waveform 680A, and with second physical components associated with a cogging torque waveform having substantially similar magnitude, phase, and other characteristics as cogging torque waveform 680A.

Thus, in various exemplary embodiments a transverse flux machine may be configured with various individual cogging torque waveforms which are directly "overlapping". However, provided the individual cogging torque waveforms remain evenly distributed across one-sixth of a voltage phase within the transverse flux machine, even though certain individual cogging torque waveforms are overlapping, the transverse flux machine may be considered to be configured according to a sixth-phase offset. Thus, any number of individual cogging torque waveforms in the transverse flux machine may "overlap", provided that an equal number of individual cogging torque waveforms "overlap" at each of the other even distribution locations across one-sixth of a voltage phase within the transverse flux machine.

Figure 7A:
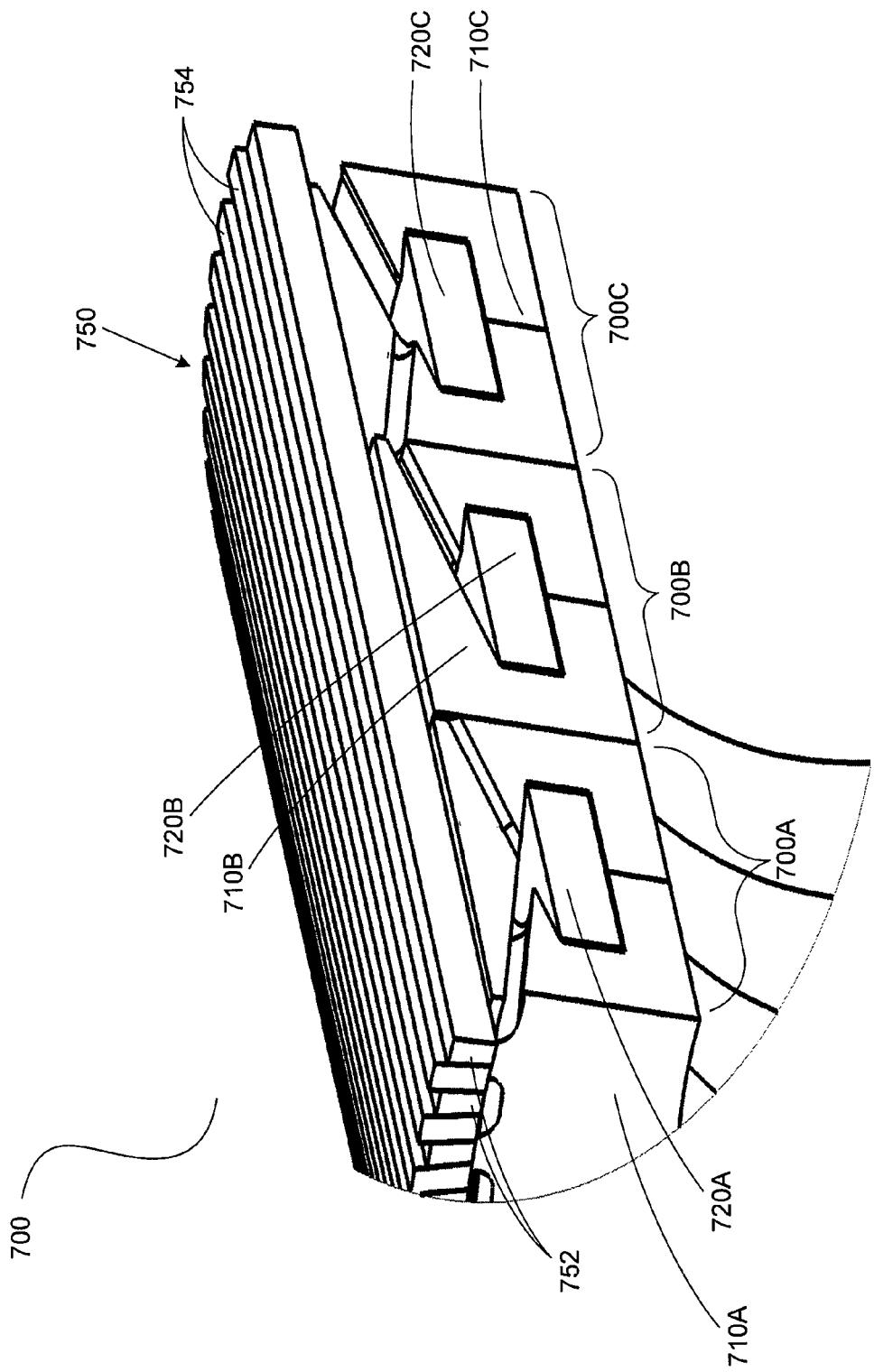
FIG. 7A illustrates an exemplary polyphase device wherein each phase utilizes a sixth-phase offset in accordance with an exemplary embodiment.

In addition to single-phase devices utilizing a sixth-phase offset, principles of the present disclosure contemplate polyphase devices wherein each phase is configured with a sixth-phase offset. With reference now to FIG. 7A, in various exemplary embodiments a transverse flux machine and/or commutated flux machine may utilize a polyphase configuration wherein each phase implements a sixth-phase offset as disclosed hereinabove. In an exemplary embodiment, a polyphase device 700 comprises a single rotor 650 coupled to three phase components 700A, 700B, and 700C. Rotor 750 comprises alternating flux concentrators 752 and permanent magnets 754. Phase component 700A comprises stator assembly 710A partially surrounding coil 720A. Phase components 700B and 700C similarly comprise stator assemblies 710B and 710C partially surrounding coils 720B and 720C, respectively. Stator assemblies 710A, 710B, and 710C are configured such that flux is conducted in alternating directions around coils 720A, 720B, and 720C responsive to movement of rotor 750.

Figure 7B:
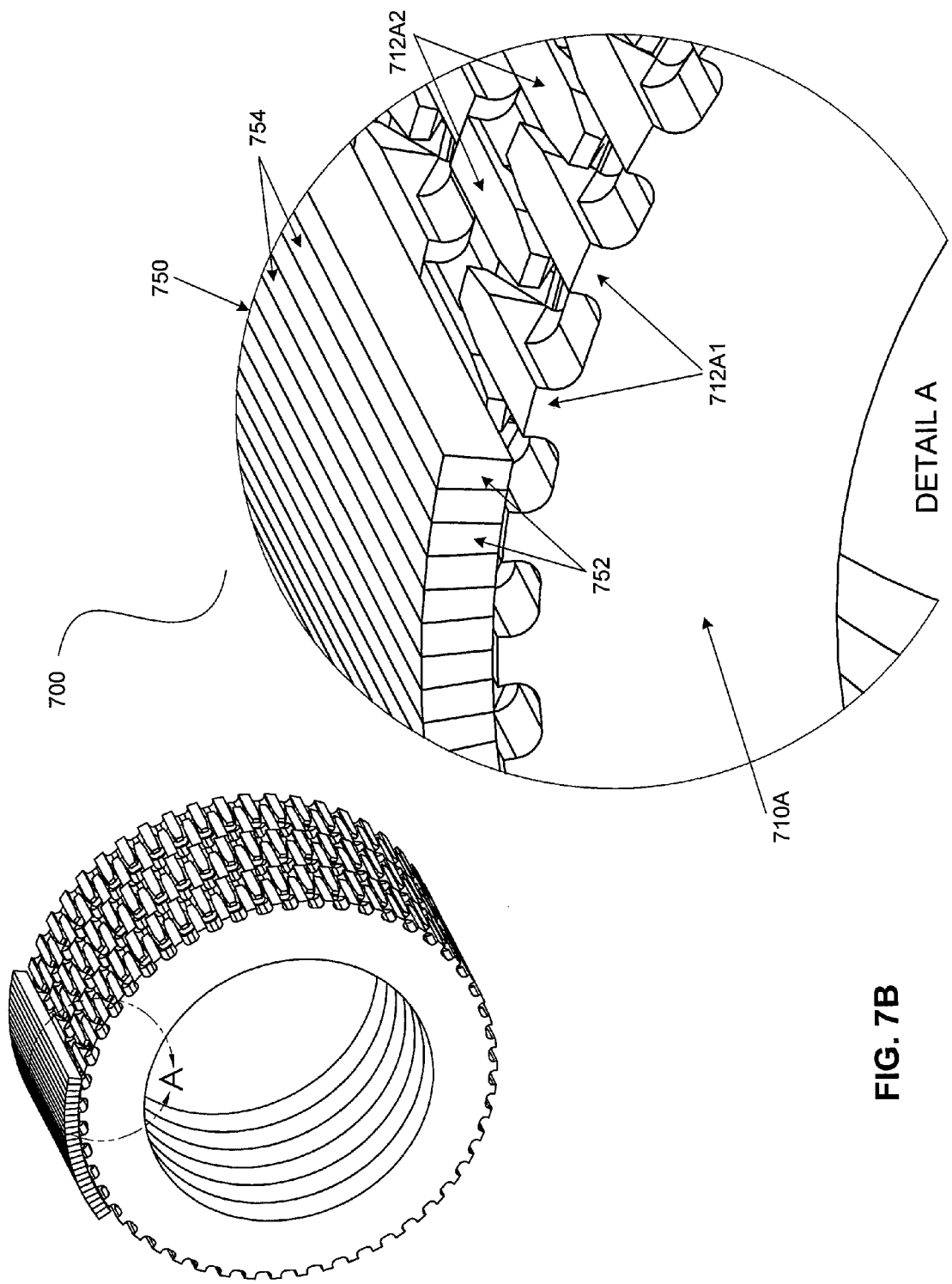
FIG. 7B illustrates an exemplary polyphase device wherein each phase utilizes a sixth-phase offset in accordance with an exemplary embodiment.

With reference to FIG. 7B, in an exemplary embodiment, stator assembly 710A is configured with two sets of stator teeth 712A1 and 712A2. Stator teeth 712A1 and 712A2 are configured according to a sixth-phase offset. Similarly, stator assemblies 710B and 710C each comprise two sets of stator teeth configured according to a sixth-phase offset.

Figure 7C:
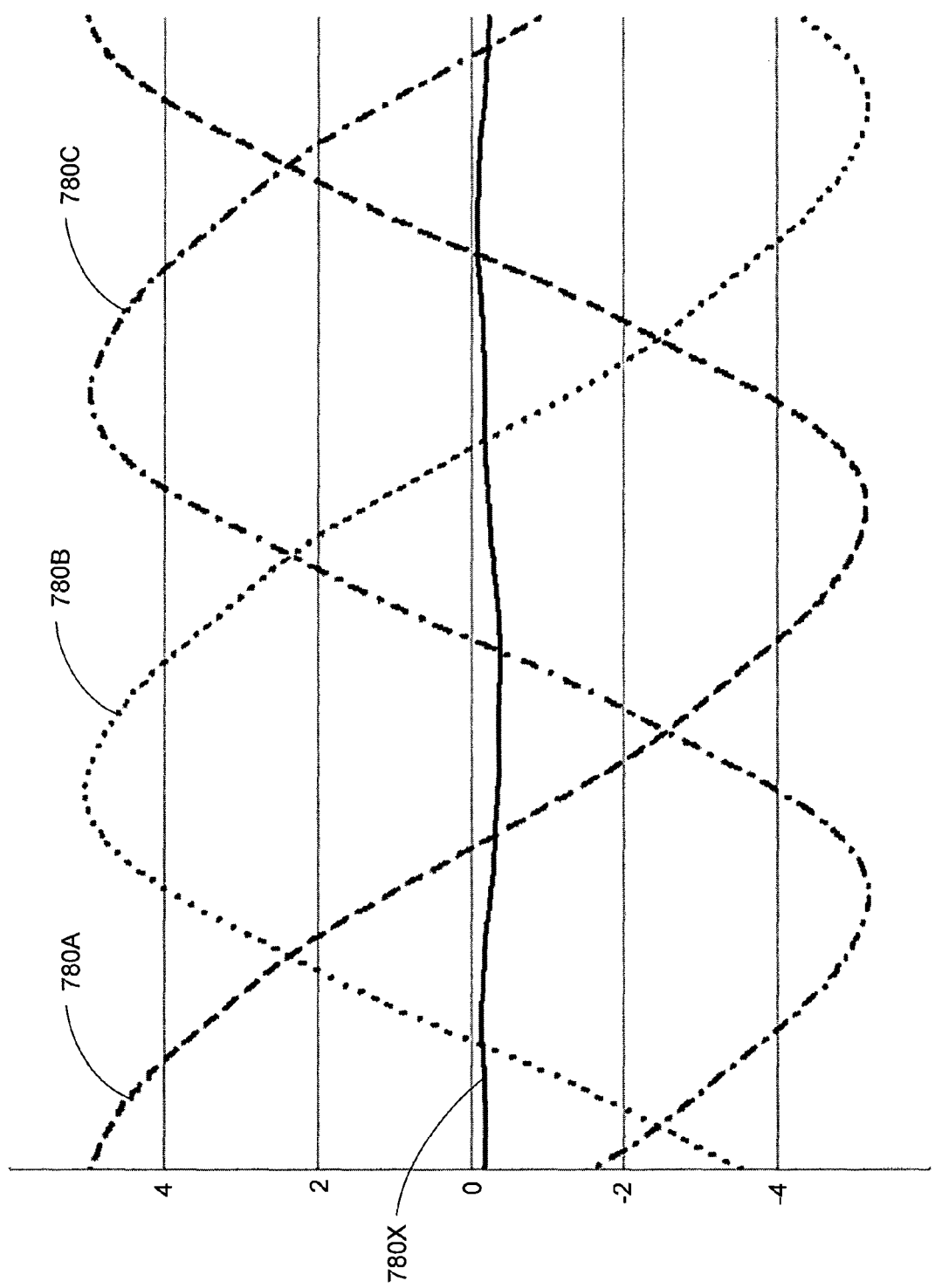
FIG. 7C illustrates cogging torque waveforms of an exemplary polyphase device configured with a sixth-phase offset in accordance with an exemplary embodiment.

In an exemplary embodiment, with reference to FIG. 7C, each of the phase components 700A, 700B, and 700C of polyphase device 700 may be configured such that the associated cogging torque waveforms 780A, 780B, and 780C are about one-third out of phase with one another (e.g., are offset by about 120°). Because the magnitude of the cogging torque of polyphase device 700 at any particular rotational position is the sum of the cogging torque of the individual phase components of polyphase device 700 at that rotational position, the peak magnitude of the combined cogging torque waveform 780X of the polyphase device 700 may be greatly reduced. Stated another way, because the individual phase components 700A, 700B, and 700C have substantially sinusoidal cogging torque waveforms 780A, 780B, 780C as a consequence of implementation of a sixth-phase offset in the corresponding stator 710A, 710B, and 710C, the phase components 700A, 700B, and 700C may be offset as desired in order to reduce and/or minimize the peak magnitude of a combined cogging torque waveform 780X.

For example, the three generally sinusoidal waveforms 780A, 780B, and 780C may be offset in order to sum to a peak magnitude of waveform 780X close to zero (for example, a peak magnitude less than 10%, less than 5%, and/or less than 2% of the peak magnitude of any of waveforms 780A, 780B, and/or 780C) at all times. Thus, polyphase device 700 may be configured to operate with greatly reduced noise and/or vibration due to the reduction in the peak magnitude of the cogging torque of polyphase device 700 as illustrated in cogging torque waveform 780X. In an exemplary embodiment, the peak magnitude of cogging torque waveform 780X may be reduced from about 5.8 N-m to about 0.2 N-m. In various exemplary embodiments, the peak magnitude of cogging torque waveform 780X may be reduced from between about 3 N-m to about 100 N-m to between about 0.05 N-m to about 2 N-m.

Moreover, in various exemplary embodiments the peak magnitude of cogging torque waveform 780X may be reduced by a percentage compared to the peak magnitude of the cogging toque of a similar polyphase device configured with a zero phase offset. In an exemplary embodiment, the peak magnitude of cogging torque waveform 780X is reduced by at least 50%. In another exemplary embodiment, the peak magnitude of cogging torque waveform 780X is reduced by at least 90%. In yet another exemplary embodiment, the peak magnitude of cogging torque waveform 780X is reduced by at least 97%.

The foregoing reduction in the peak magnitude of cogging torque waveform 780X of polyphase device 700 may be achieved in connection with only a small reduction in the RMS open circuit voltages of each phase 700A, 700B, 700C of polyphase device 700. In an exemplary embodiment, when compared to a similar polyphase device configured with a zero phase offset, the peak magnitude of cogging torque waveform 780X is reduced by about 90% while the RMS open circuit voltages of each phase 700A, 700B, 700C are reduced by only about 4%. In another exemplary embodiment, the peak magnitude of cogging torque waveform 780X is reduced by about 97% while the RMS open circuit voltages of each phase 700A, 700B, 700C are reduced by only about 5%. In this manner, a small amount of voltage may be "traded" for a greatly reduced peak magnitude of cogging torque waveform 780X via utilization of a sixth-phase offset.

In contrast, with momentary reference to FIG. 7D, a polyphase device configured with a zero-phase offset is able to obtain only a limited reduction in the peak magnitude of associated cogging torque waveform 780X', as cogging torque waveforms 780A', 780B', and 780C' are substantially non-sinusoidal.

Moreover, as illustrated in the exemplary modeled values of Table 2 below, implementation of a sixth-phase offset (or nonzero integer multiple thereof) allows greater reduction in the peak magnitude of the cogging torque waveform of polyphase device 700 as compared to implementation of an non sixth-phase offset.

TABLE 2

| Phase Offset in Each Phase of Exemplary Polyphase Device 700 | Exemplary Polyphase Device 700 Cogging Torque Peak Magnitude (Newton-meters) | Exemplary Polyphase Device 700 Cogging Torque RMS value (Newton-meters) | % Reduction in Cogging Torque Peak Magnitude Compared to 0 Phase Offset |
|---|---|---|---|
| 0 | 5.87 | 4.01 | 0 |
| 1/20 (0.05) | 4.91 | 3.52 | 16.4% |
| 1/9 (0.1111) | 2.28 | 1.72 | 61.2% |
| 1/7 (0.1429) | 0.86 | 0.72 | 85.4% |
| 1/6 (0.1666) | 0.23 | 0.15 | 96.1% |
| 1/5 (0.2) | 0.76 | 0.66 | 87.0% |
| 1/4 (0.25) | 1.04 | 0.89 | 82.3% |
| 3/10 (0.3) | 0.51 | 0.47 | 91.3% |
| 1/3 (0.3333) | 0.23 | 0.15 | 96.1% |

Principles of the present disclosure may be applied to transverse flux machines and/or commutated flux machines. Moreover, principles of the present disclosure may also be applied to radial flux machines as embodied in various conventional electric motors. For example, each phase of a polyphase radial flux electric motor may be configured according to a sixth-phase offset, allowing the polyphase radial flux electric motor to achieve a reduced peak magnitude of cogging torque.

Principles of sixth-phase offset as disclosed hereinabove may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed May 3, 2010, now U.S. Patent Application Publication No. 2011/0169365 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of utilization of transverse flux machines and/or commutated flux machines in electric bicycles as disclosed in U.S. patent application Ser. No. 12/772,959 filed May 3, 2010, now U.S. Patent Application Publication No. 2011/0169381 entitled "TRANSVERSE AND/OR COMMUTATED FLUX SYSTEMS FOR ELECTRIC BICYCLES" having the same filing date and common ownership as the present application, the contents of which are hereby incorporated by reference in their entirety.

Moreover, principles of the present disclosure may suitably be combined with any number of principles disclosed in any one of and/or all of the co-pending U.S. patent applications incorporated by reference herein. Thus, for example, a particular transverse flux machine and/or commutated flux machine may incorporate use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

In an exemplary embodiment, an electrical machine comprises: a plurality of magnets interleaved with a plurality of flux concentrators, wherein the plurality of magnets have alternating magnetic orientation such that the plurality of flux concentrators have alternating magnetic poles; and a plurality of switches in number N configured to transfer flux from the plurality of flux concentrators, wherein a first switch and an adjacent second switch in the plurality of switches are separated, center to center, by an angular distance of about (360/N) degrees plus about (⅙*(360/N)) degrees, and wherein all other adjacent switches in the plurality of switches are each separated, center to center, by an angular distance of about (360/N) degrees minus about ((⅙*(360/N))/(N−1)) degrees.

In an exemplary embodiment, a method for forming a stator portion for a transverse flux machine comprises: calculating an even distribution angular distance for a set of stator teeth distributed about the circumference of the stator portion, wherein the even distribution angular distance is equal to 360 degrees divided by the total number of stator teeth in the set; calculating a sixth-phase offset distance for a first stator tooth and an adjacent second stator tooth in the set, wherein the sixth-phase offset distance is equal to one-sixth of the even distribution angular distance; positioning the first stator tooth and the second stator tooth on the circumference of the stator portion such that the first stator tooth and the second stator tooth, when measured center-to-center, are separated by an angular distance about equal to the even distribution angular distance plus the sixth-phase offset distance; and positioning the remaining stator teeth in the set of stator teeth on the circumference of the stator portion such that all center-to-center angular distances between adjacent stator teeth in the set, with the exception of the center-to-center angular distance between the first stator tooth and the adjacent second stator tooth, are about equal to: (the even distribution angular distance)−((the sixth-phase offset distance)/(the number of stator teeth in the set, minus one)).

In an exemplary embodiment, an electrical machine comprises: a stator comprising a first stator portion and a second stator portion, the first stator portion comprising a first set of stator teeth distributed about the circumference of the first stator portion according to a sixth-phase offset, and the second stator portion comprising a second set of stator teeth distributed about the circumference of the second stator portion according to a sixth-phase offset; a coil at least partially enclosed by the first stator portion and the second stator portion; and a rotor magnetically coupled to the stator, wherein the rotor comprises a plurality of magnets interleaved with a plurality of flux concentrators, wherein the plurality of magnets have alternating magnetic orientation such that the plurality of flux concentrators have alternating magnetic poles, and wherein the electrical machine is at least one of a transverse flux machine or a commutated flux machine. In a first position of the rotor, the first set of stator teeth are configured to transfer flux from a first set of the plurality of flux concentrators having a first polarity, and in the first position of the rotor, the second set of stator teeth are configured to transfer flux to a second set of the plurality of flux concentrators having a polarity opposite the first polarity. In a second position of the rotor, the first set of stator teeth are configured to transfer flux to the second set of the plurality of flux concentrators, and in the second position of the rotor, the second set of stator teeth are configured to transfer flux from the first set of the plurality of flux concentrators. The cogging torque waveform associated with operation of the electrical machine is substantially sinusoidal.

In an exemplary embodiment, a method for reducing torque ripple in an electrical device comprises: configuring a plurality of flux switches in the electrical device according to a sixth phase offset in order to increase the sinusoidality of a back EMF waveform of the electrical device; and energizing a coil in the electrical device with a sinusoidal input voltage.

In an exemplary embodiment, a method for reducing the magnitude of cogging torque in a polyphase device comprises: configuring each of a first, second, and third set of flux switches in the polyphase device according to a sixth phase offset in order to increase the sinusoidality of a first, second, and third cogging torque waveform, respectively; and aligning each of the first, second, and third set of switches in the polyphase device such that each set differs in phase from the other sets by a phase angle of about 120 degrees.

In an exemplary embodiment, an electrical machine comprises: a first set A of physical components comprising a first magnet, a first flux concentrator, and a first flux switch, wherein set A is configured to generate a first cogging torque waveform; a second set B of physical components comprising a second magnet, a second flux concentrator, and a second flux switch, wherein set B is configured to generate a second cogging torque waveform; and a third set C of physical components comprising a third magnet, a third flux concentrator, and a third flux switch, wherein set C is configured to generate a third cogging torque waveform; wherein the physical location of set A, set B, and set C in the electrical machine is independent of the phase relationship between the first cogging torque waveform, the second cogging torque waveform, and the third cogging torque waveform, wherein the electrical machine is configured according to a sixth-phase offset, and wherein the electrical machine is at least one of a transverse flux machine or a commutated flux machine.

In an exemplary embodiment, an electrical machine comprises a plurality of sets of physical components, each set comprising a magnet, a flux concentrator, and a flux switch, wherein each set is configured to generate a cogging torque waveform, wherein at least two sets which are not physically adjacent in the electrical machine generate cogging torque waveforms which are adjacent in phase, wherein the electrical machine is configured according to a sixth-phase offset, and wherein the electrical machine is at least one of a transverse flux machine or a commutated flux machine.

What is claimed is:

1. A stator for a transverse flux machine, the stator comprising:
   a first stator portion comprising a first set of stator teeth in number N disposed about the circumference of the first stator portion,
   wherein a first stator tooth and an adjacent second stator tooth in the first set of stator teeth are separated, center to center, by an angular distance of about (360/N) degrees plus about (⅙*(360/N)) degrees, and
   wherein all other adjacent stator teeth in the first set of stator teeth are separated, center to center, by an angular distance of about (360/N) degrees minus about ((⅙*(360/N))/(N−1)) degrees.

2. The stator of claim 1, further comprising:
   a second stator portion comprising a second set of stator teeth in number M disposed about the circumference of the second stator portion,
   wherein a first stator tooth and an adjacent second stator tooth in the second set of stator teeth are separated by an angular distance of about (360/M) degrees plus about (⅙*(360/M)) degrees center to center, and
   wherein all other adjacent stator teeth in the second set of stator teeth are each separated by an angular distance of about (360/M) degrees minus about ((⅙*(360/M))/(M−1)) degrees center to center.

3. The stator of claim 2, wherein the number N is larger than 50.

4. The stator of claim 3, wherein the stator is configured with an outer diameter of less than six inches.

5. The stator of claim 2, wherein N is equal to M.

6. The stator of claim 2, wherein the first stator portion and the second stator portion are coupled such that the first set of stator teeth is interleaved with the second set of stator teeth.

7. The stator of claim 2, wherein any of the first set of stator teeth provides a flux path to any of the second set of stator teeth, the flux path traversing at least partially around a coil at least partially enclosed by the first stator portion and the second stator portion.

8. The stator of claim 2, wherein a combined cogging torque waveform associated with operation of the stator approximates an ideal sinusoid.

9. The stator of claim 2, wherein the stator is configured with at least one of a double sixth-phase offset or a triple sixth-phase offset.

10. The stator of claim 2, wherein the stator is coupled to a wheel of an electric bicycle.

11. The stator of claim 2, further comprising a conductive coil which does not traverse completely around a rotational axis of a rotor associated with the stator.

12. The stator of claim 2, wherein the stator is configured to reduce torque ripple when utilized as part of an electrical machine.

13. The stator of claim 2, wherein the second harmonic content of a combined cogging torque waveform associated with operation of the stator has a magnitude of less than 5% of the magnitude of the first harmonic content of the combined cogging torque waveform.

14. The stator of claim 1, wherein the first stator portion comprises at least one of silicon steel, powdered metal, or amorphous metal.

15. A method of making a stator for an electrical machine, the method comprising:
providing a first stator portion comprising a first set of stator teeth in number N disposed about the circumference of the first stator portion,
wherein a first stator tooth and an adjacent second stator tooth in the first set of stator teeth are separated, center to center, by an angular distance of about (360/N) degrees plus about ($\frac{1}{6}$*(360/N)) degrees, and
wherein all other adjacent stator teeth in the first set of stator teeth are separated, center to center, by an angular distance of about (360/N) degrees minus about (($\frac{1}{6}$*(360/N))/(N−1)) degrees.

16. The method of claim 15, further comprising coupling the first stator portion to a second stator portion comprising a second set of stator teeth in number M disposed about the circumference of the second stator portion,
wherein a first stator tooth and an adjacent second stator tooth in the second set of stator teeth are separated by an angular distance of about (360/M) degrees plus about ($\frac{1}{6}$*(360/M)) degrees center to center, and
wherein all other adjacent stator teeth in the second set of stator teeth are each separated by an angular distance of about (360/M) degrees minus about (($\frac{1}{6}$*(360/M))/(M−1)) degrees center to center.

* * * * *